United States Patent
Wei et al.

(10) Patent No.: US 11,652,516 B2
(45) Date of Patent: May 16, 2023

(54) METHOD AND APPARATUS FOR CONFIGURATION OF CSI-RS FOR 3-D MIMO

(71) Applicant: QUALCOMM Incorporated, San Diego, CA (US)

(72) Inventors: Chao Wei, Beijing (CN); Yu Zhang, Beijing (CN); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/673,795

(22) Filed: Nov. 4, 2019

(65) Prior Publication Data
US 2020/0067576 A1    Feb. 27, 2020

Related U.S. Application Data

(63) Continuation of application No. 15/029,498, filed as application No. PCT/CN2013/085479 on Oct. 18, 2013, now Pat. No. 10,469,139.

(51) Int. Cl.
*H04B 7/0417* (2017.01)
*H04B 7/0456* (2017.01)
(Continued)

(52) U.S. Cl.
CPC ......... *H04B 7/0421* (2013.01); *H04B 7/0482* (2013.01); *H04B 7/065* (2013.01);
(Continued)

(58) Field of Classification Search
CPC .. H04B 7/0421; H04B 7/0482; H04B 7/0639; H04B 7/065; H04L 5/0023;
(Continued)

(56) References Cited

U.S. PATENT DOCUMENTS 8,599,708 B2   12/2013   Chen et al.
8,681,651 B2   3/2014   Bhattad et al.
(Continued)

FOREIGN PATENT DOCUMENTS

CN    102035619 A    4/2011
CN    102273115 A    12/2011
(Continued)

OTHER PUBLICATIONS

Alcatel-Lucent Shanghai Bell et al., "Considerations on CSI Feedback Enhancements for High-Priority Antenna Configurations", 3GPP TSG-RAN WG1 #66, 3GPP Draft; R1-112420, 3rd Generation Partnership Project (3GPP), Mobile Competence Centre; 650, Route Des Lucioies; F-06921 Sophia-Antipolis Cedex, France, vol. RAN WG1, No. Athens, Greece; Aug. 22, 2011, Aug. 18, 2011 (Aug. 18, 2011), 7 Pages, XP050537814, [retrieved on Aug. 18, 2011], Section 5.

(Continued)

*Primary Examiner* — Ricky Q Ngo
*Assistant Examiner* — Stephen N Steiner
(74) *Attorney, Agent, or Firm* — Dalei Dong; Norton Rose Fulbright LLP

(57) ABSTRACT

In an aspect, a method of wireless communication includes transmitting first reference signals from a base station using a first set of antenna ports, and receiving first feedback information at the base station from a user equipment (UE). The first feedback information may be associated with the first reference signals. The method includes configuring a first precoder based on the first feedback information, and transmitting second reference signals to the UE based on the configuration of the first precoder. The method includes receiving second feedback information at the base station from the UE. The second feedback information may be associated with the second reference signals. The method (Continued)

includes configuring a second precoder based on the second feedback information.

22 Claims, 14 Drawing Sheets

(51) Int. Cl.
| | | |
|---|---|---|
| *H04B 7/06* | (2006.01) | |
| *H04L 5/00* | (2006.01) | |
| *H04W 72/04* | (2009.01) | |
| *H04W 72/044* | (2023.01) | |

(52) U.S. Cl.
CPC ......... *H04B 7/0639* (2013.01); *H04L 5/0023* (2013.01); *H04L 5/0051* (2013.01); *H04L 5/0057* (2013.01); *H04W 72/042* (2013.01); *H04W 72/044* (2013.01)

(58) Field of Classification Search
CPC .. H04L 5/0051; H04L 5/0057; H04W 72/042; H04W 72/044
See application file for complete search history.

(56) References Cited

U.S. PATENT DOCUMENTS

| | | | |
|---|---|---|---|
| 9,877,312 B2 | 1/2018 | Kim et al. | |
| 10,469,139 B2 | 11/2019 | Wei et al. | |
| 2011/0261894 A1 | 10/2011 | Yu et al. | |
| 2012/0163333 A1 | 6/2012 | Arnott et al. | |
| 2013/0021926 A1 | 1/2013 | Geirhofer et al. | |
| 2013/0039203 A1* | 2/2013 | Fong .................. | H04B 7/024 370/252 |
| 2013/0077581 A1 | 3/2013 | Lee et al. | |
| 2013/0163544 A1 | 6/2013 | Lee et al. | |
| 2013/0258964 A1 | 10/2013 | Nam et al. | |
| 2013/0272263 A1 | 10/2013 | Pi et al. | |
| 2014/0098689 A1* | 4/2014 | Lee .................. | H04B 7/0469 370/252 |
| 2014/0328260 A1* | 11/2014 | Papasakellariou .... | H04L 1/1861 370/329 |
| 2015/0049824 A1 | 2/2015 | Kim et al. | |
| 2016/0149680 A1* | 5/2016 | Kang .................. | H04B 7/0626 370/329 |

FOREIGN PATENT DOCUMENTS

| | | |
|---|---|---|
| CN | 103229428 A | 7/2013 |
| CN | 103314614 A | 9/2013 |
| KR | 20100121445 A | 11/2010 |
| KR | 20110093555 A | 8/2011 |
| KR | 20130084007 A | 7/2013 |
| KR | 20130084607 A | 7/2013 |
| WO | WO-2011088403 A1 | 7/2011 |
| WO | WO-2011162422 A1 | 12/2011 |
| WO | WO-2012061749 A2 | 5/2012 |
| WO | WO-2013109041 A1 | 7/2013 |
| WO | WO-2013133645 A1 | 9/2013 |

OTHER PUBLICATIONS

European Search Report—EP19196332—Search Authority—The Hague—dated Jan. 2, 2020.
International Search Report and Written Opinion—PCT/CN2013/085479—ISA/EPO—dated Jul. 29, 2014.
Qualcomm Incorporated: "Codebook Design Targeting 2D Antenna Array," 3GPP TSG-RAN, WG1#80b R1-151414, Apr. 11, 2015, URL:http://www.3gpp.org/ftp/tsg_ran/WG1_RL1/TSGR1_80b/Docs/R1-151414.zip, pp. 1-5.
Supplementary European Search Report—EP13895799—Search Authority—Munich—dated Oct. 12, 2017.
Supplementary Partial European Search Report—EP13895799—Search Authority—Munich—dated May 11, 2017.
Hitachi Ltd: "Discussion on Parameters Configured per CSI-RS Port for CoMP," R1-122704, 3GPP TSG-RAN WG1 #69, Prague,Czech, May 21-25, 2012, (May 25, 2012), 3 pages.

* cited by examiner

METHOD AND APPARATUS FOR CONFIGURATION OF CSI-RS FOR 3-D MIMO

CROSS-REFERENCE TO RELATED APPLICATIONS

This application is a continuation of U.S. patent application Ser. No. 15/029,498, entitled, "METHOD AND APPARATUS FOR CONFIGURATION OF CSI-RS FOR 3-D MIMO," filed on Apr. 14, 2016, which is a US National Stage Application under 35 U.S.C. § 371 of International Application No. PCT/CN2013/085479, entitled "METHOD AND APPARATUS FOR CONFIGURATION OF CSI-RS FOR 3-D MIMO," filed on Oct. 18, 2013, each of which is expressly incorporated by reference herein in its entirety.

BACKGROUND

Field

Aspects of the present disclosure relate generally to wireless communication systems, and more particularly, to configuring precoders for transmission of signals from an antenna array.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Disclosed herein are aspects of a methods, apparatuses, and computer-readable storage devices operable to support wireless communications. In an aspect, a method of wireless communication includes transmitting first reference signals from a base station using a first set of antenna ports, and receiving first feedback information at the base station from a user equipment (UE). The first feedback information may be associated with the first reference signals. The method includes configuring a first precoder based on the first feedback information, and transmitting second reference signals to the UE based on the configuration of the first precoder. The method includes receiving second feedback information at the base station from the UE. The second feedback information may be associated with the second reference signals. The method includes configuring a second precoder based on the second feedback information.

In another aspect, method of wireless communication includes receiving, at a user equipment (UE), first reference signals from a first set of antenna elements of a base station, and generating first feedback information associated with the first reference signals. The method includes transmitting the first feedback information to the base station. The method includes determining, at the UE, a set of resources allocated to the HE based on the first feedback information, and receiving second reference signals at the UE. The second reference signals may be transmitted to the UE from the base station using the allocated set of resources. The method includes generating second feedback information associated with the second reference signals, and transmitting the second feedback information to the base station.

In yet another aspect, a method of wireless communication include transmitting first reference signals to a UE using a plurality of antennas of a base station. Each antenna of the plurality of antennas may be associated with one or more antenna elements, and each antenna element may be associated with one or more antenna ports. The method include receiving first feedback information from the UE. The first feedback information may be associated with the first reference signals. The method includes determining an offset value based on the first feedback information, and initializing a scrambling sequence based on offset value. The method includes transmitting second reference signals to the UE. The second reference signals may be encoded based on the initialized scrambling sequence.

In an aspect, a computer-readable storage device stores instructions that, when executed by a processor, cause the processor to perform operations including transmitting first reference signals using a first set of antenna ports, and receiving first feedback information from a user equipment (UE). The first feedback information may be associated with the first reference signals. The operations include configuring a first precoder based on the first feedback information, and transmitting second reference signals to the UE based on the configuration of the first precoder. The operations include receiving second feedback information at the base station from the UE. The second feedback information may be associated with the second reference signals. The operations include configuring a second precoder based on the second feedback information.

In another aspect, a computer-readable storage device stores instructions that, when executed by a processor, cause the processor to perform operations including receiving first reference signals from a first set of antenna elements of a base station, and generating first feedback information associated with the first reference signals. The operations include transmitting the first feedback information to the base station. The operations include determining a set of resources allocated to the UE based on the first feedback information, and receiving second reference signals. The second reference signals may be transmitted to the UE from the base station using the allocated set of resources. The operations include generating second feedback information associated with the second reference signals, and providing second feedback information to the base station.

In yet another aspect, a computer-readable storage device stores instructions that, when executed by a processor, cause the processor to perform operations including transmitting first reference signals to a UE using a plurality of antennas of a base station. Each antenna of the plurality of antennas may be associated with one or more antenna elements, and each antenna element may be associated with one or more antenna ports. The operations include receiving first feedback information from the UE. The first feedback information is associated with the first reference signals. The operations include determining an offset value based on the first feedback information. The operations include initializing a scrambling sequence based on offset value, and transmitting second reference signals to the UE. The second reference signals may be encoded based on the initialized scrambling sequence.

In an aspect, an apparatus for wireless communication includes a processor, and a memory coupled to the processor. The memory storing instructions that, when executed by the processor, cause the processor to perform operations including transmitting first reference signals from a base station using a first set of antenna ports, and receiving first feedback information at the base station from a user equipment (UE). The first feedback information may be associated with the first reference signals. The operation include configuring a first precoder based on the first feedback information, and transmitting second reference signals to the UE based on the configuration of the first precoder. The operations include receiving second feedback information from the UE. The second feedback information may be associated with the second reference signals. The operations include configuring a second precoder based on the second feedback information.

In another aspect, an apparatus for wireless communication includes a processor, and a memory coupled to the processor. The memory stores instructions that, when executed by the processor, cause the processor to perform operations including receiving first reference signals from a first set of antenna elements of a base station, and generating first feedback information associated with the first reference signals. The operations include transmitting the first feedback information to the base station. The operations include determining a set of resources allocated to the UE based on the first feedback information, and receiving second reference signals. The second reference signals may be transmitted from the base station using the allocated set of resources. The operations include generating second feedback information associated with the second reference signals, and providing the second feedback information to the base station.

In yet another aspect, an apparatus for wireless communication includes a processor, and a memory coupled to the processor. The memory may store instructions that, when executed by the processor, cause the processor to perform operations including transmitting first reference signals to a UE using a plurality of antennas. Each antenna of the plurality of antennas may associated with one or more antenna elements, and each antenna element may be associated with one or more antenna ports. The operations include receiving first feedback information from the UE. The first feedback information may be associated with the first reference signals. The operations include determining an offset value based on the first feedback information, initializing a scrambling sequence based on offset value, and transmitting second reference signals to the UE. The second reference signals may be encoded based on the initialized scrambling sequence.

In an aspect, an apparatus for wireless communication includes means for transmitting first reference signals using a first set of antenna ports, and means for receiving first feedback information from a user equipment (UE). The first feedback information may be associated with the first reference signals. The apparatus includes means for configuring a first precoder based on the first feedback information, and means for transmitting second reference signals to the UE based on the configuration of the first precoder. The apparatus includes means for receiving second feedback information from the UE. The second feedback information may be associated with the second reference signals. The apparatus includes means for configuring a second precoder based on the second feedback information.

In another aspect, an apparatus for wireless communication includes means for receiving first reference signals from a first set of antenna elements of a base station and means for generating first feedback information associated with the first reference signals. The apparatus includes means for transmitting the first feedback information to the base station. The apparatus includes means for determining a set of resources allocated to the UE based on the first feedback information, and means for receiving second reference signals at the UE. The second reference signals may be transmitted to the UE from the base station using the allocated set of resources. The apparatus includes means for generating second feedback information associated with the second reference signals, and means for providing second feedback information to the base station.

In yet another aspect, an apparatus for wireless communication includes means for transmitting first reference signals to a UE using a plurality of antennas. Each antenna of the plurality of antennas may be associated with one or more antenna elements, and each antenna element may be associated with one or more antenna ports. The apparatus includes means for receiving first feedback information associated with the first reference signals from the UE. The apparatus includes means for determining an offset value based on the first feedback information, and means for initializing a scrambling sequence based on offset value. The apparatus includes means for transmitting second reference signals to the UE. The second reference signals may be encoded based on the initialized scrambling sequence.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UNITS that use E-UTRA. UTRA, E-UTRA, UNITS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
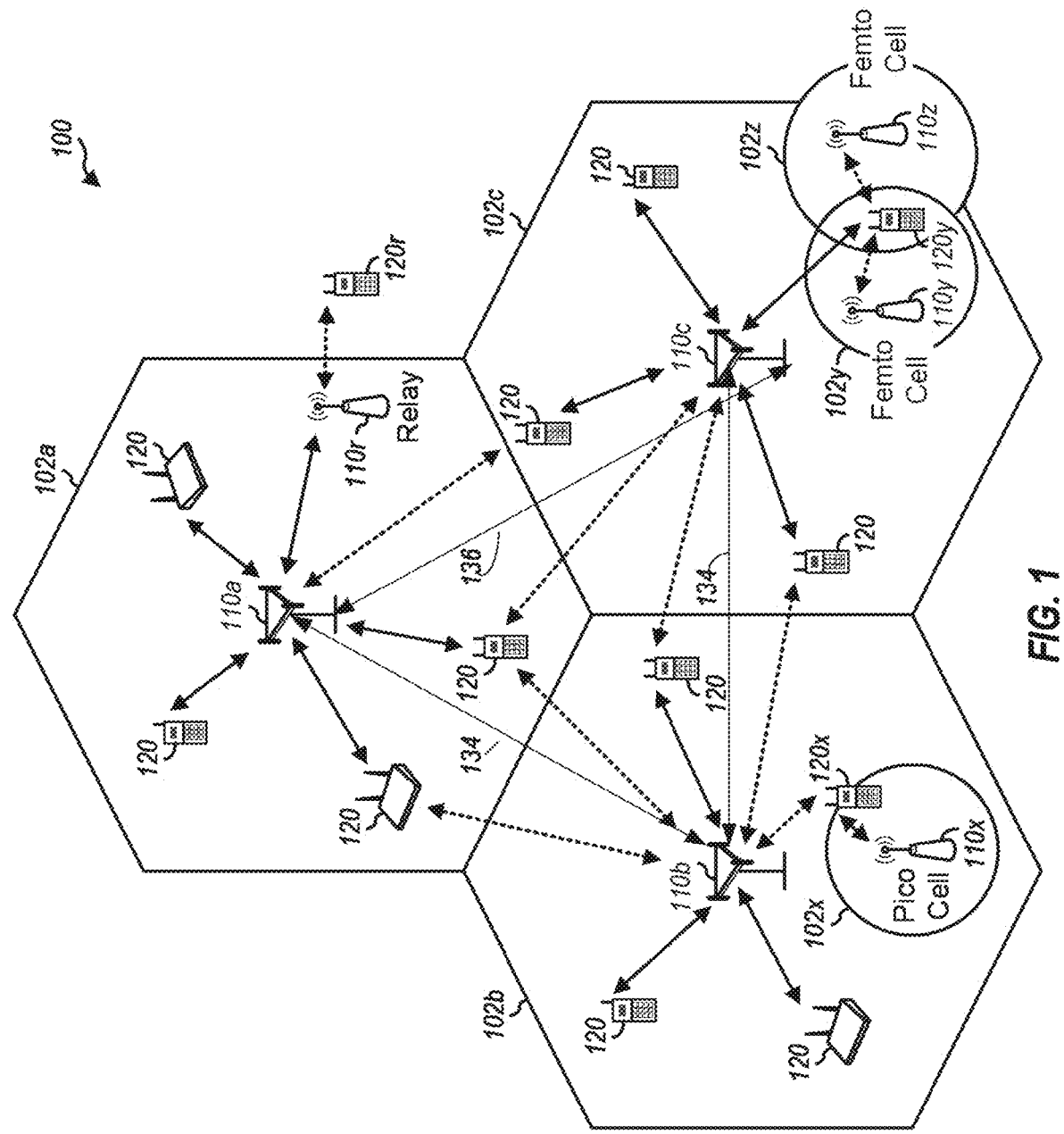
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
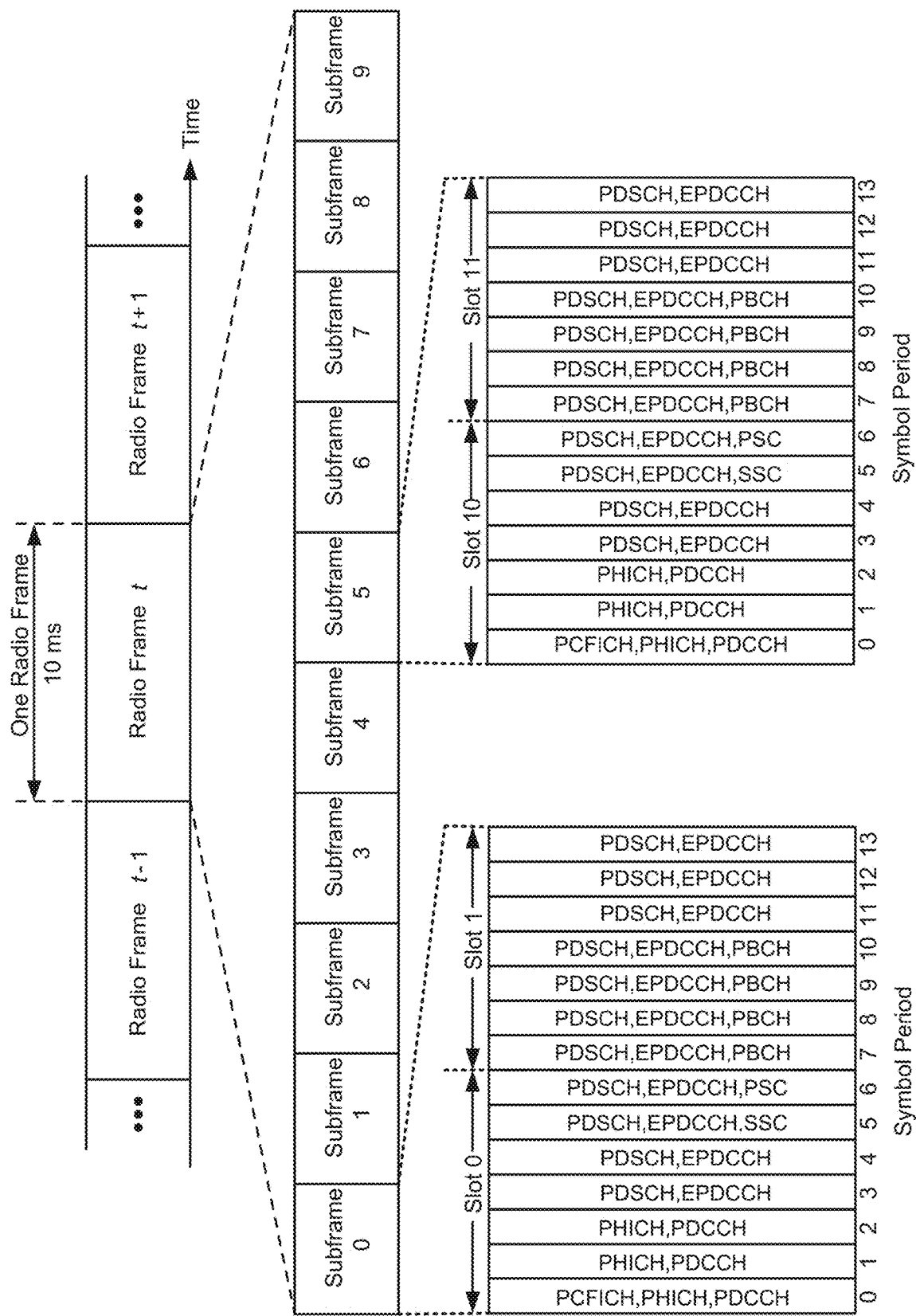
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Enhanced-Physical Downlink Control Channel (EPDCCH) is included in the later symbol periods of each subframe. The EPDCCH is a new type of control channel. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a uni cast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
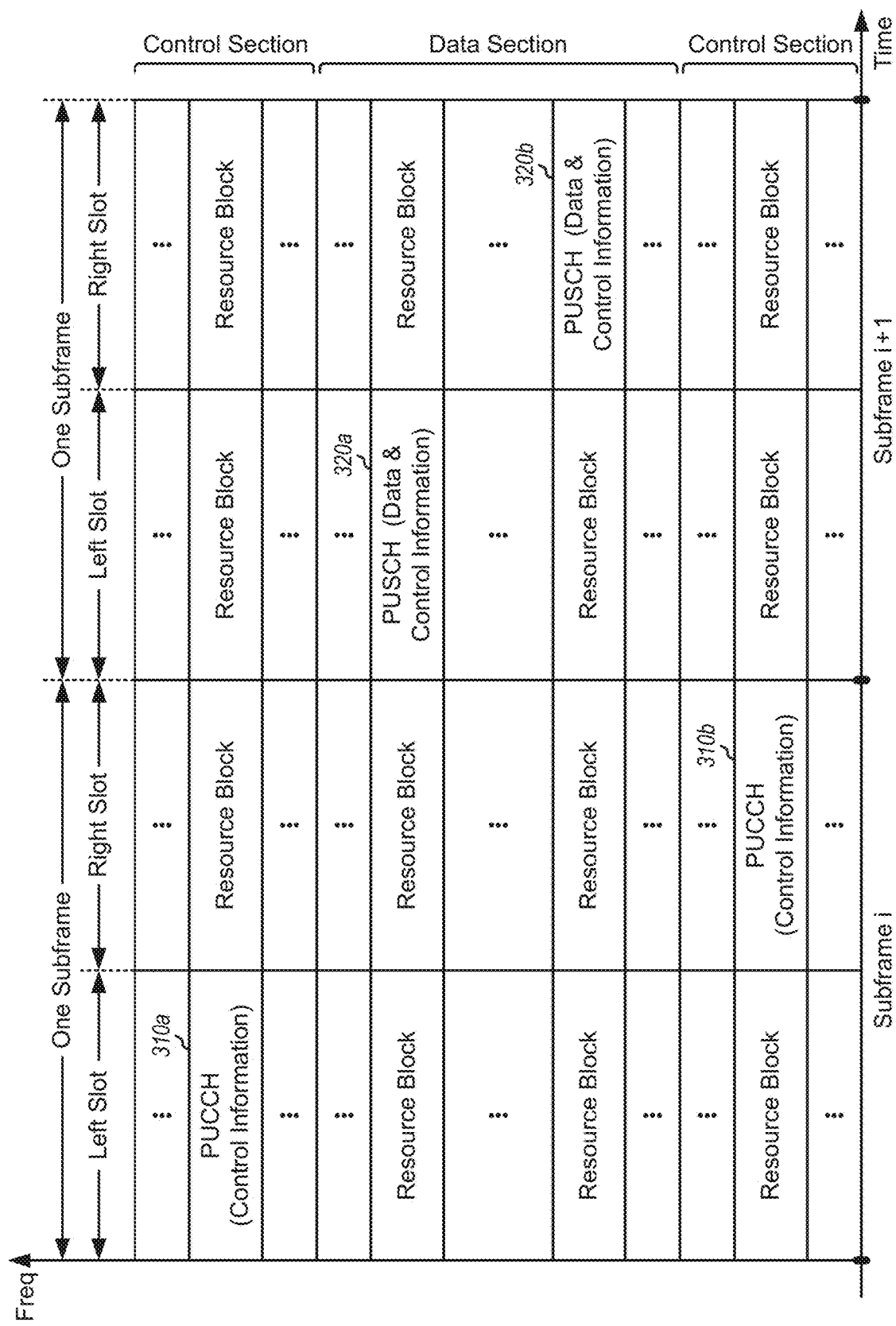
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
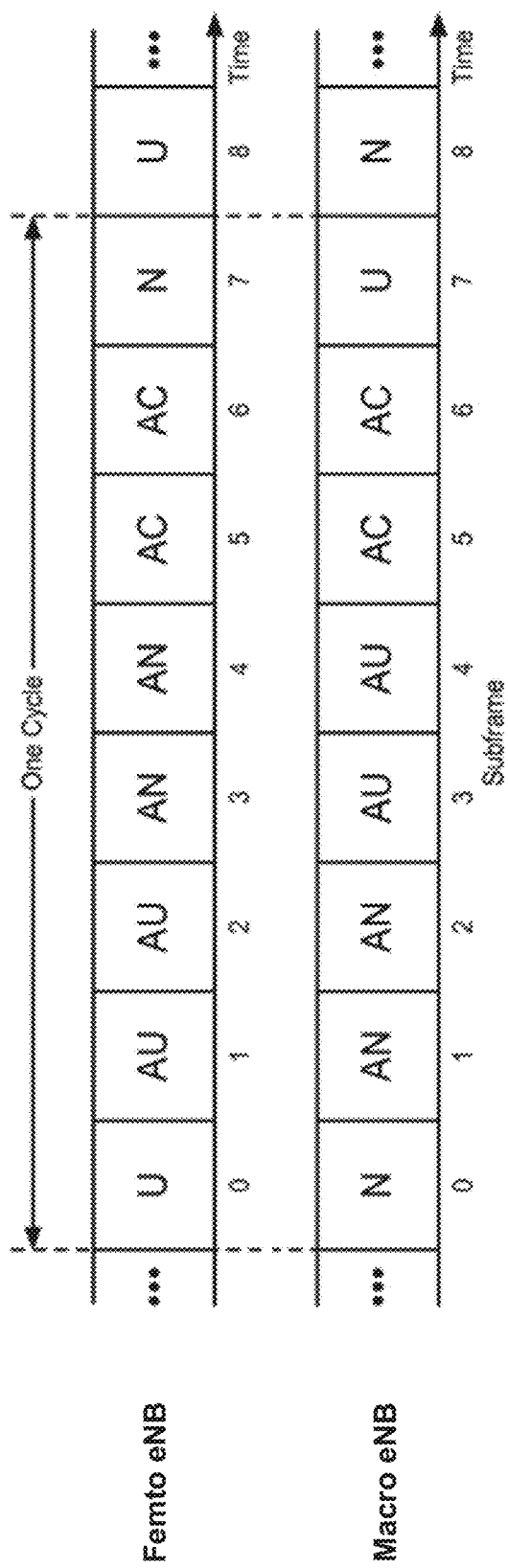
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA HE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities. This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
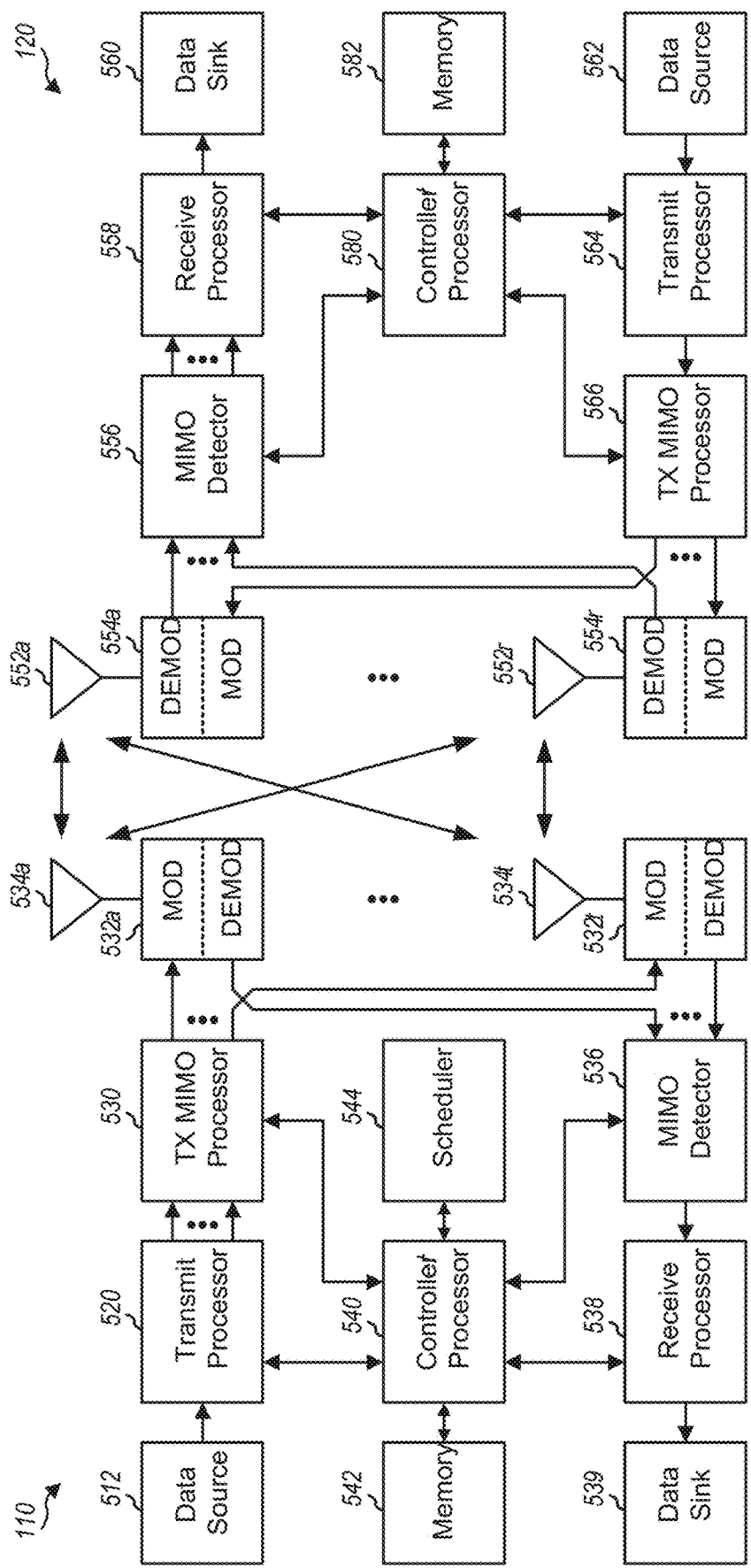
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODS) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controllers/processor 580 and/or other processors and modules at the UE 120 may also perform or direct the execution of the functional blocks illustrated in FIGS. 6-15, and/or other processes for the techniques described herein. The memories 542 and 582 may store data and program codes for the eNB 110 and the UE 120, respectively. A scheduler 544 may schedule UEs for data transmission on the downlink and/or uplink.

Figure 6:
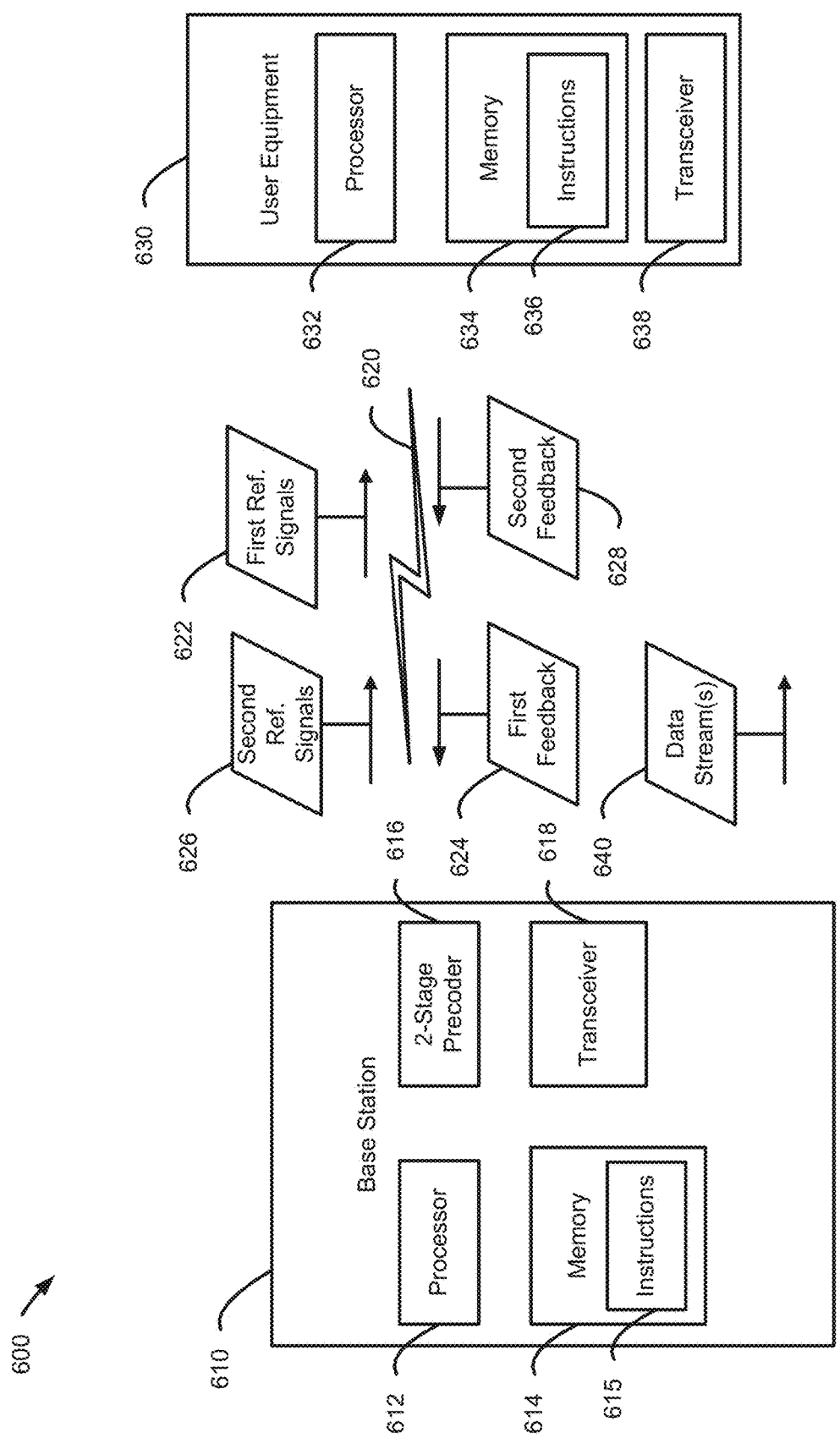
FIG. 6 is an illustrative aspect of a system 600 for wireless communication using a two stage channel state information (CSI)-reference signal (RS) process.

Referring to FIG. 6, an illustrative aspect of a system 600 for wireless communication using two dependent channel state information (CSI)-reference signal (RS) processes is shown. As shown in FIG. 6, the system 600 includes a base station 610 and a user equipment (UE) 630. The base station 610 includes a processor 612, a memory 614, a two-stage precoder 616, and a transceiver 618. The memory 614 stores instructions 615 that, when executed by the processor 612, cause the processor 612 to perform operations described herein with reference to FIGS. 6-15. In an aspect, the base station 610 may be an evolved nodeB (eNB) (e.g., the eNB 110a, the eNB 110b, or the eNB 110c of FIG. 1, or the base station/eNB 110 of FIG. 5). In an aspect, the transceiver 638 may include the antennas 534a through 534t described with reference to FIG. 5 and other circuitry (e.g., the demodulators/modulators 532a through 532t of FIG. 5, the MIMO detector 536, the receive processor 538, the transmit MIMO processor 530 of FIG. 5, the transmit processor 520 of FIG. 5, etc.). In an aspect, the processor 612 may be the controller/processor 540 of FIG. 5 and the memory 614 may be the memory 542 of FIG. 5. The transceiver 638 may include or may be coupled to an antenna array that includes a plurality of antennas. In an aspect, the plurality of antennas may include eight (8) antennas and each of the antennas may be associated with eight (8) antenna ports. Each of the eight (8) antennas may include two or more antenna elements. In an aspect, the antenna elements may be arranged in a cross-polarized configuration. Each of the antennas may be associated with one or more antenna ports. In an aspect, the antenna array may be associated with sixty-four (64) antenna ports.

The UE 630 includes a processor 632, a memory 634, and a transceiver 638. The memory 634 stores instructions 636 that, when executed by the processor 632, cause the processor 632 to perform operations described herein with reference to FIGS. 6-15. In an aspect, the UE 630 may be the UE 120 of FIG. 1 (e.g., the UE 120*x* or the UE 120*y* of FIG. 1) or may be the UE 120 described with reference to FIG. 5. In an aspect, the transceiver 638 may include the antennas 552*a* through 552*r* described with reference to FIG. 5 and other circuitry (e.g., the demodulators/modulators 554*a* through 554*r* of FIG. 5, the MIMO detector 556, the receive processor 558, the transmit MUM processor 566 of FIG. 5, the transmit processor 564 of FIG. 5, etc.). In an aspect, the processor 632 may be the controller/processor 580 of FIG. 5 and the memory 634 may be the memory 582 of FIG. 5.

During operation, the base station 610 may communicate with the UE 630 via a wireless link 620. Signals transmitted from the base station 610 to the UE 630 may be encoded using the two-stage precoder 616. The two-stage precoder 616 may include a first precoder (not shown in FIG. 6) and a second precoder (not shown in FIG. 6) and may be initialized using a two-stage process. During a first stage of the two-stage process, the base station 610 may transmit a first reference signal 622 to the UE 630 via a forward link portion of the wireless communication link 620. The first reference signal 622 may be a first stage CSI-RS signal. In an aspect, the first reference signal 622 may be cell common (e.g., broadcast to all UEs in a cell served by the base station 610) and radio resource control (RRC) messaging may be used to indicate that the UE 630 is to provide feedback information based on the first reference signal. In an aspect, the first reference signal 622 may be transmitted in association with a resource block, such as the resource block 850, described with reference to FIG. 8. The first reference signal 622 may be transmitted from the base station 610 using a set of antenna ports of the plurality of antenna ports. Illustrative aspects of transmitting the first reference signal 622 using sets of antenna ports are described with reference to FIG. 9.

The UE 630 may receive the first reference signal 622 and may generate first feedback information based on the first reference signal 622. The first feedback information may be transmitted from the UE 630 to the base station 610 as a first feedback signal 624 via a reverse link portion of the wireless communication link 620. In an aspect, the first feedback signal 624 includes a preceding matrix indicator (PMI) associated with the first reference signal 622, a rank indication (RI) associated with the first reference signal 622, or both. Additionally, the UE 630 may receive, from the base station 610, a configuration message (not shown in FIG. 1) that includes information the identifies the number of antenna ports included in the set of antenna ports, a subframe location index, a resource element configuration associated with the resource block, and a transmit time interval (TTI) bundling flag that indicates whether the first reference signal 622 is transmitted using TTI bundling, as described with reference to FIG. 9. The HE 630 may detect the first reference signal 622 and may generate the first feedback signal 624 based at least in part on the information included in the configuration message. In an aspect, the UE may determine a set of resources allocated to the UE for stage two signaling based on the first feedback information, as described with reference to FIGS. 10 and 12.

The base station 610 may receive the first feedback signal 624 from the UE 630, and may configure the first precoder based on the first feedback information included in the first feedback signal 624. In an aspect, the first precoder may be a port precoder, as described with reference to FIG. 7. The first precoder may map the set of antenna ports to a set of antenna elements of the plurality of antenna elements. The base station 610 may transmit a second reference signal 626 to the UE 630 based on the configuration of the first precoder.

The UE 630 may receive the second reference signal 626 from the base station 610 via the wireless communication link 620 and may generate second feedback information based on the second reference signal 626. The second feedback information may identify a second PMI associated with the second reference signal 626, a second RI associated with the second reference signal 626, or both. The base station 610 may receive the second feedback signal 628 from the UE 630, and may configure the second precoder of the two-stage precoder 616 based on the second feedback information. In an aspect, the second precoder may be a layer precoder, as described with reference to FIG. 7. The second precoder may map a data stream to a particular set of antenna ports of the plurality of antenna ports based on the second feedback information included in the second reference signals 628.

In response to configuring the two-stage precoder 616 (e.g., the first precoder and the second precoder), the base station 610 may transmit data streams to the UE 630. For example, the base station 610 may receive a data stream to be transmitted to the UE 630. The base station 610 may process the data stream using the first precoder and the second precoder to produce an encoded data stream. The base station 610 may transmit a data stream signal 640 to the UE 630 using the wireless communication link 620. The data stream signal 640 may include the encoded data stream. By using the two-stage process to configure the two-stage precoder 616, the base station 610 may be operable to support an increased number of antenna ports (e.g., sixty-four antenna ports). Additionally, by using the two-stage process to configure the two-stage precoder 616, an amount of bandwidth consumed by pilot signals and CSI-RS feedback may be reduced.

Two-Stage Reference Signals and UE Grouping

In an aspect, the base station 610 may classify UE into groups. For example, the base station 610 may classify the UE 630 based on the first feedback information. Additionally, the base station 610 may receive first additional feedback signals from additional UE (not shown in FIG. 6). The first additional feedback signals may be generated by the additional UE based on the first reference signal 622. In an aspect, the base station 610 may configure the first precoder based at least in part on the first feedback signal 624 received from the UE 630 and the first additional feedback signals received from the additional UE.

The base station 610 may allocate resources to the UE based on the classification of the UE. For example, the UE may be classified into a particular UE group based on the PMI index included in the first feedback information included in the first feedback signal 624. The resources allocated to the UE based on the first feedback information may be used to transmit the second reference signal 626 to the UE. Additionally or alternatively, the base station 610 may allocate a first set of resources to the particular UE group based on the first feedback information, and may transmit the second reference signal 626 to the UEs included in the particular UE group using the first set resources. In an aspect, the base station 610 may transmit control information to the UE 630. The control information may identify the resources allocated to the UE 630 based on the classification. Illustrative aspects of transmitting the second reference signal 626 using an allocation of resources are described with reference to FIGS. 10 and 12.

In an aspect, the LIE may be classified into a particular UE group based at least in part on the RI included in the first feedback signal 624. Alternatively or additionally, the UE may be classified into the particular LTE group based on the PMI and the RI. In an aspect, the second reference signal 626 may be transmitted from a set of allocated resources according to a hopping pattern, as described with reference to FIG. 12. The base station 610 may determine a next set of resources to be used to transmit the second reference signals to the first LYE group during a next TTI based on the first feedback information and the hopping pattern, as described with reference to FIG. 12.

In response to transmitting the second reference signal 626, the base station 610 may receive the second feedback signal 628 and may receive second additional feedback information from the additional UE. The second additional feedback information may be associated with the second reference signal 626. The base station 610 may configure the second precoder based at least in part on the second additional feedback information. In an aspect, the base station 610 may process additional data streams using the first precoder and the second precoder to produce additional encoded data streams. The additional data streams may be processed as described with reference to FIG. 7, and may be transmitted by the base station 610 to the additional UE.

Scrambling Sequence Initialization Using Two-Stage Reference Signals

In an aspect, the base station may determine an offset value based on the first feedback information and may initialize a scrambling sequence based at least in part on the offset value. For example, the offset value may be determined based on a resource index associated with a PMI index (e.g., the PMI index included in the first feedback information). In an aspect, the scrambling sequence may be initialized according to equation 1 as follows:

$$c_{init} = 2^{10} \cdot (7 \cdot (n_s+1) + l + 1) \cdot (2 \cdot N_{ID}^{cell} + 1) + 2 \cdot N_{ID}^{cell} + N_{CP} + n_{offset}$$ (Equation 1)

where $n_{offset}$ is the determined CSI-RS resource index or one of the higher layer configured values selected by the resource index, $n_s$ indicates a slot number in a radio frame, l is the orthogonal frequency division multiplexing (OFDM) symbol number, and $N_{ID}^{cell}$ corresponds to the cell identifier that the UE 630 is synched to (e.g., the cell served by the base station 610).

In response to initializing the scrambling sequence, the base station 610 may encode the second reference signal 626 based on the initialized scrambling sequence. The base station 610 may dynamically modify the offset value (e.g., $n_{offset}$) based on another set of resources used to transmit the second reference signal 626 to the UE 630 during a second TTI. For example, when the base station 610 uses resource mapping hopping, as described with reference to FIG. 12, the offset value (e.g., $n_{offset}$) may be updated based on the particular CSI-RS resource to be used to transmit the second reference signal 626.

In an aspect, the base station 610 may determine a second offset value based on the additional first feedback information received from the UE 630. The additional feedback information may be generated by the UE 630 in response to receiving additional first reference signals from the base station 610. The additional first reference signals may transmitted by the base station subsequent to transmission of the first reference signal 622. The base station 610 may initialize a second scrambling sequence based on the second offset value, and may transmit additional second reference signals to the UE 630. The additional second reference signals may be encoded based on the second scrambling sequence. Additionally or alternatively, the scrambling sequence may be used to encode data streams using the second precoder, as described with reference to FIG. 7.

Figure 7:
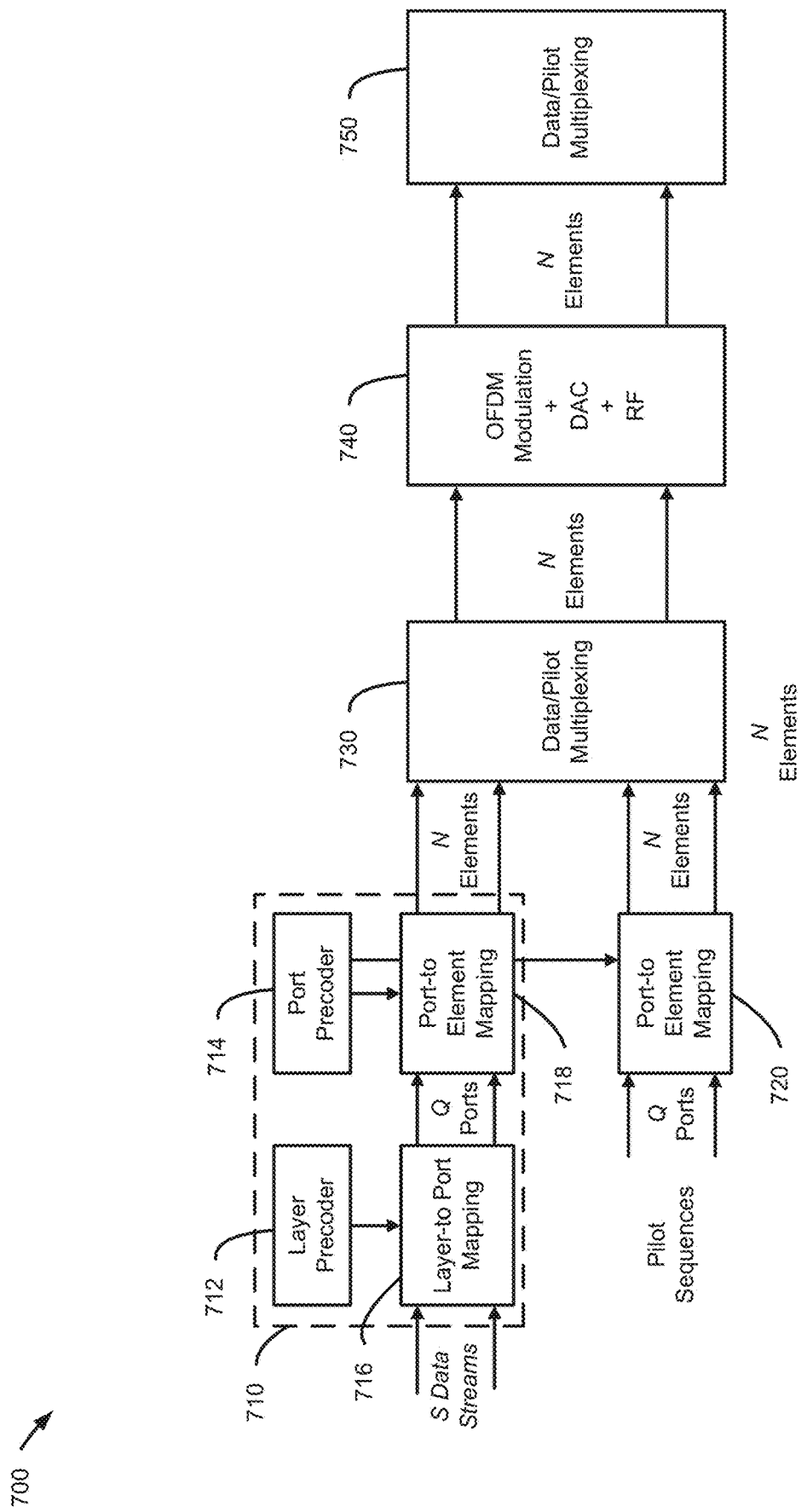
FIG. 7 is a block diagram of using a two stage precoder to perform a two-stage preceding process.

Referring to FIG. 7, a block diagram of using a two-stage precoder 710 to perform a two-stage precoding process 700 is shown. In an aspect, the two-stage precoding process 700 may be performed by a base station, such as the base station 610 of FIG. 6 and the two-stage precoder 710 may be the two-stage precoder 616 of FIG. 6. As shown in FIG. 7, the two-stage precoder 710 includes a layer precoder 712 and a port precoder 714. In an aspect, the layer precoder 712 may be the second precoder of the two-stage precoder 616 of FIG. 6, and the port precoder 714 may be the first precoder of the two-stage precoder 616 of FIG. 6. The port precoder 714 may map a set of antenna ports to a set of antenna elements of a plurality of antenna elements of a base station (e.g., the base station 610 of FIG. 6). The layer precoder 712 may map a data stream to a set of antenna ports of the plurality of antenna ports based on second feedback information (e.g., the second reference signal 628). Additionally, or alternatively, the layer precoder 712 may encode the data streams using a scrambling sequence (e.g., the scrambling sequence described with reference to equation 1 of FIG. 6).

During operation, the port precoder may perform port-to-element mapping, at a logical block 720, for transmission of pilot sequences to produce a first set of mapped pilot sequences. As shown in FIG. 7, performing port-to-element mapping may include mapping Q antenna ports to N antenna elements, where Q is less than N. The first set of mapped pilot sequences may be provided to a data/pilot multiplexing logical block 730, where the first set of mapped pilot sequences are multiplexed with mapped data streams (e.g., data streams that have been precoded using the two-stage precoder 710), to produce data/pilot multiplexed streams. The data/pilot multiplexed streams may be provided from the data/pilot multiplexing logical block 730 to an OFDM modulation logical block 740.

The OFDM modulation logical block 740 may perform digital to analog conversion on the data/pilot multiplexed streams and may apply orthogonal frequency division multiplexing (OFDM) the data/pilot multiplexed streams to produce data/pilot 0MM streams. The data/pilot OFDM streams may be provided from the OFDM modulation logical block 740 to a second data/pilot multiplexing block 750 where the data/pilot OFDM streams are multiplexed prior to transmission.

During a first stage of the two-stage precoding process 700, a first set of pilot sequences may be processed using the port precoder 714 and the logical blocks 720, 730, 740, 750 to produce a first transmitted signal. In an aspect, the first transmitted signal may correspond to the first reference signal 622 of FIG. 6. The base station may receive first feedback information from a user equipment (UE) and may configure the port precoder 714 based on the first feedback information. In an aspect, the UE may be the UE 630 of FIG. 6 and the first feedback information may be received at the base station as the first feedback signal 624 of FIG. 6.

During a second stage of the two-stage precoding process 700, a second set of pilot sequences may be processed using the port precoder 714 and the logical blocks 720, 730, 740, 750 to produce a second transmitted signal. In an aspect, the second transmitted signal may correspond to the second reference signal 626 of FIG. 6. The base station may receive second feedback information from the UE and may configure the layer precoder 712 based on the first feedback information. In an aspect, the second feedback information may be received at the base station as the second feedback signal 628 of FIG. 6.

After configuring the layer precoder 712 based on the second feedback information, the two-stage precoder 710 may be configured for transmission of data streams to the UE. For example, the two-stage precoder 710 may receive S data streams. The S data streams may be mapped to a set of Q ports at the logical block 716 using the layer precoder 712 to produce a first set of mapped data streams. The first set of mapped data streams may be provided to a second logical block 718, where the set of Q ports are mapped to a set of N antenna elements. Thus, the two-stage encoder 710 may generate a set of data streams that are mapped to a set of Q ports and to a set of N antenna elements and may provide the set of data streams to the logical blocks 730, 740, 750 for further processing and transmission from the set of N antenna elements.

Figure 8:
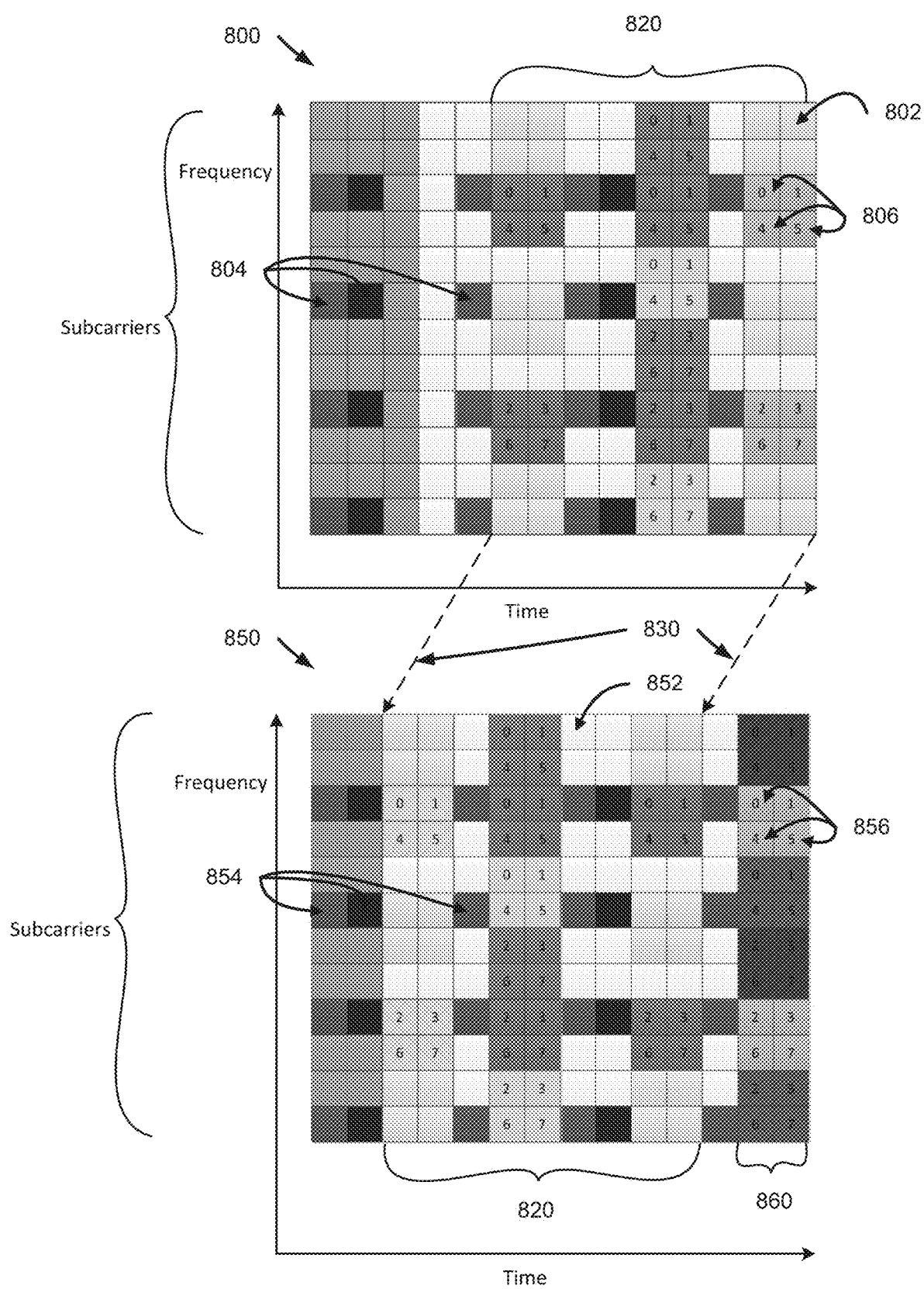
FIG. 8 is an illustrative aspect of a resource block configuration for use in transmission of signals in association with sixty-four (64) antenna ports.

Referring to FIG. 8, an illustrative aspect of a resource block configuration for use in transmission of signals in association with sixty-four (64) antenna ports is shown. As shown in FIG. 8, a first resource block 800 and a second resource block 850. The first reference block 800 and the second reference block 850 include a plurality of resource elements 802, 852, respectively. Particular resource elements of the plurality of resource elements 802, 852 may be reserved for transmission of common reference signals (CRS) and UE specific reference signals (UE-RS). For example, in the reference block 800, resource elements 804 correspond to resource elements of the plurality of resource elements 802 that have been reserved for transmission of CRS. In the reference block 850, resource elements 854 correspond to resource elements of the plurality of resource elements 852 that have been reserved for transmission of CRS.

The resource blocks 800, 850 also include resource elements that may be used to transmit first stage reference signals (e.g., the first reference signal 622 of FIG. 6). For example, the first resource block 800 includes resource elements 806 that may be used for transmitting the first reference signals and the second resource block 850 includes resource elements 856 that may be used for transmitting the first reference signals. The first resource block 800 may support transmissions in association with up to forty (40) antenna ports. The second resource block 850 may support transmission in associated with sixty-four (64) antenna ports according to one or more of the aspects described herein. As indicated by the dashed lines 830, the second resource block 850 includes a portion 820 of the first resource block 800 that has been shifted to the left within the second resource block 850. Additionally, a second portion 860 of the plurality of resource elements 852 has been allocated within the second resource block 850 for transmission of the first reference signals using additional ports (e,g., ports 40-63).

One or more of the aspects described herein may transmit signals using a resource block similar to the resource block 850. For example, the base station 610 of FIG. 6 may transmit the first reference signal 622 according to the resource element allocation of the second resource block 850. Additionally, the control message transmitted to the UE 630 from the base station 610 may identify the resource element configuration used to transmit the first reference signal 622 associated with the resource block. The resource element configuration may identify a set of resource elements (e.g., the resource elements 856) of the plurality of resource elements 852 that include the first reference signal 622.

Figure 9:
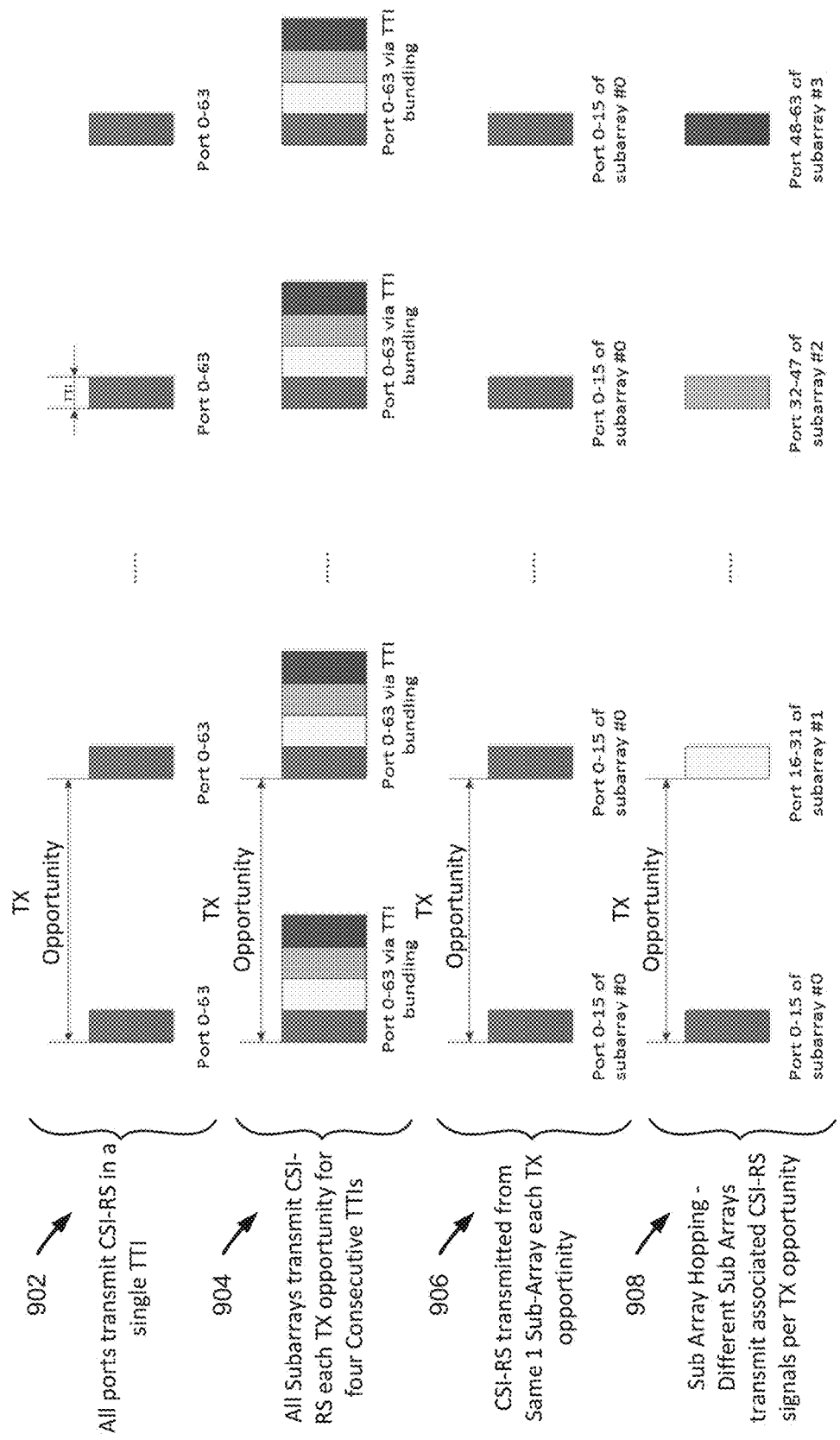
FIG. 9 shows illustrative aspects of transmitting first reference signals using sets of antenna ports.

Referring to FIG. 9, illustrative aspects of transmitting first reference signals using sets of antenna ports are shown. At 902, a first illustrative aspect of transmitting a first reference signal (e.g., the first reference signal 622 of FIG. 6) using sixty-four (64) antenna ports (e.g., ports 0-63) is shown. In this aspect, a base station (e.g., the base station 610 of FIG. 6) may transmit the first reference signal using all antenna ports during each transmit opportunity. In an aspect, the base station may use frequency division multiplexing (FDM) to transmit the first reference signal using the sixty-four (64) ports.

At 904, a second illustrative aspect of transmitting the first reference signal using TTI bundling is shown. In this aspect, the plurality of antenna ports may be divided into N sets of antenna ports and the first reference signal may be transmitted using a single set of antenna ports of the N sets of antenna ports. For example, when N is four (4), the sixty-four (64) ports are divided into four (4) groups of ports and each of the four (4) groups of ports may include sixteen (16) ports. During a first TTI, a first group of ports (e.g., ports 0-15) are used to transmit the first reference signals. During a second TTI, a second group of ports (e.g., ports 16-31) is used to transmit the first reference signals. During a third TTI, a third group of ports (e.g., ports 32-47) is used to transmit the first reference signals. During a fourth TTI, a fourth group of ports (e.g., ports 48-63) is used to transmit the first reference signals. The first TTI, the second TTI, the third TTI, and the fourth TTI may be consecutive TTIs. Thus, when TTI bundling is used to transmit the first reference signal, the base station may divide the plurality of ports into N sets of ports, and may transmit the first reference signal using a different set of ports of the N sets of ports may be used during N consecutive TTIs at each transmit opportunity. In an aspect, the base station may use time division multiplexing (TDM) to transmit the first reference signals using TTI bundling.

At 906, a third illustrative aspect of transmitting the first reference signal is shown. In this aspect, the plurality of antenna ports may be divided into N sets of antenna ports and the first reference signal may be transmitted using a same set of antenna ports of the N sets of antenna ports during each transmit opportunity. For example, as shown in FIG. 9, at 906, during each transmit opportunity, a first set of ports (e.g., ports 0-15) is used to transmit the first reference signals. By using one set of ports to transmit the first reference signals at each transmit opportunity, an amount of overhead associated with transmission of reference signals may be reduced. Further, assuming that channel covariance between different sets of ports is the same, a port precoder (e.g., the first precoder described with reference to FIG. 6 or the port precoder 714 of FIG. 7) configured based on first feedback signals (e.g., the first feedback signal 624 of FIG. 6) may be used to transmit a second reference signal (e.g., the second reference signal 626 of FIG. 6) on other sets of ports (e.g., ports 16-31, 32-47, and 48-63, respectively).

At 908, a fourth illustrative aspect of transmitting the first reference signal is shown. In this aspect, the base station may divide the ports into N sets of ports, and may transmit the first reference signals from a different set of ports during each transmit opportunity. For example, as shown in FIG. 9, at 908, during a first transmit opportunity, the base station may transmit the first reference signal using a first set of ports (e.g., ports 0-15), and, during a second transmit opportunity, the base station may transmit the first reference signals using a second set of ports (e.g., ports 16-31). At a third transmit opportunity, the base station may transmit the first reference signal using a third set of ports (e.g., ports 32-47), and, during a fourth transmit opportunity, the base station may transmit the first reference signals using a fourth set of ports (e.g., ports 48-63). By transmitting the first reference signals using a different set of ports during each transmit opportunity, an amount of overhead used for transmitting the first reference signals may be reduced.

Figure 10:
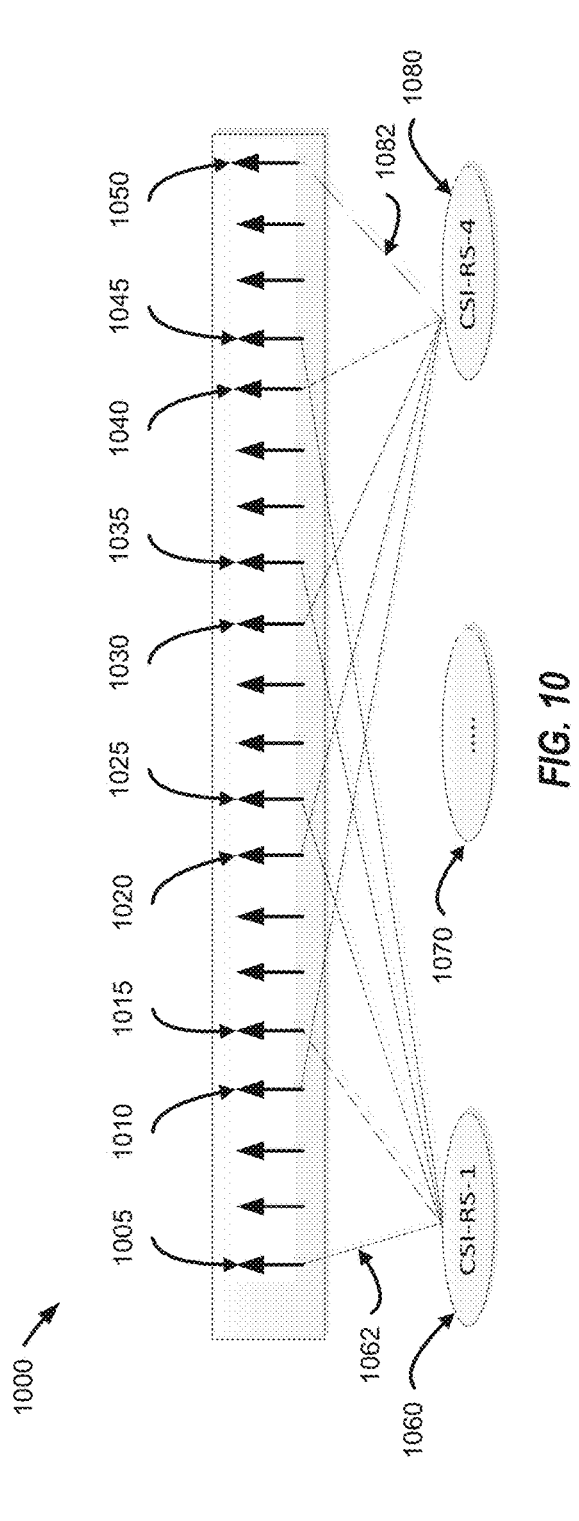
FIG. 10 is an illustrative aspect of using implicit signaling to determine resource mapping associated with transmission of second reference signals.

Referring to FIG. 10, an illustrative aspect of using implicit signaling to determine resource mapping associated with transmission of second reference signals is shown and designated 1000. As described with reference to FIG. 6, a user equipment (UE), such as the UE 630 of FIG. 6, may implicitly determine a set of resources allocated for transmission of second reference signals (e.g., the second reference signal 626 of FIG. 6) based on first feedback information (e.g., the first feedback information described with reference to FIG. 6). For example, the first feedback information may include a precoding matrix indicator (PMI). The PMI included in the first feedback information may be associated with a particular channel state information (CSI)-reference signal (RS) configuration during stage two of the two-stage precoding process. The particular CSI-RS configuration may identify a particular set of resources allocated for transmission of second reference signals (e.g., the second reference signal 626 of FIG. 6).

For example, in FIG. 10, a plurality of resources 1060, 1070, 1080 are shown. Each of the resources may be associated with a particular CSI-RS. Each of the possible PMI values may be associated with a particular CSI-RS resource of the plurality of resources 1060, 1070, 1080. For example, the CSI-RS resource 1060 may be associated with a first set of PMI indices indicated by the lines 1062, and the CSI-RS resource 1080 may be associated with a second set of PMI indices indicated by the lines 1082. The first set of PMI indices includes a first PMI index 1005, a second PMI index 1015, a third PMI index 1025, a fourth PMI index 1035, and a fifth PMI index 1045. The second set of PMI indices includes a sixth PMI index 1010, a seventh PMI index 1020, an eighth PMI index 1030, a ninth PMI index 1040, and a tenth PMI index 1050.

The UE may determine a particular CSI-RS resource allocated for transmission of the second stage reference signal (e.g., the second reference signal 626 of FIG. 6) based on the PMI index included in the first feedback information. For example, when the PMI index included in the first feedback information corresponds to a PMI index included in the first set of PMI indices, the UE may use the CSI-RS resource 1060 to receive the second stage reference signal. As another example, when the PMI index included in the first feedback information corresponds to a PMI index included in the second set of PMI indices, the UE may use the CSI-RS resource 1080 to receive the second stage reference signal.

The set of PMI indices associated with a particular resource may be determined such that different PMIs on the same resource (e.g., the first PMI 1005 and the second PMI 1015) are orthogonal or quasi-orthogonal. By associating a set of PMIs that are orthogonal or quasi-orthogonal with the particular resource, an amount of interference between signals may be reduced or eliminated. Additionally, multiple UE may be classified according to the PMI index identified in a respective first feedback signal received from each of the multiple UE. By associating multiple orthogonal or quasi-orthogonal PMI indices with a particular group of UE, a base station is able to transmit second stage reference signals (e.g., the second reference signal 626 of FIG. 6) to multiple UE (e.g., a group of UE) with a reduced amount of overhead and interference. In an aspect, the base station may use radio resource control (RRC) signaling to provide information that indicates the PMI indices and resources allocated to the PMI indices. In an aspect, the information that indicates the PMI indices and resources allocated to the PMI indices may be provided when the UE enters the cell served by the base station. Because the UE is able to determine the resource to be used by the base station for transmitting the stage two reference signal, an amount of signaling between the base station and the UE may be reduced (e.g., due to less overhead signaling to indicate the set of resource to be used for stage two signaling). In an aspect, the configuration of CSI-RS resources may be varied, rather than static, as described with reference to FIG. 12.

Figure 11:
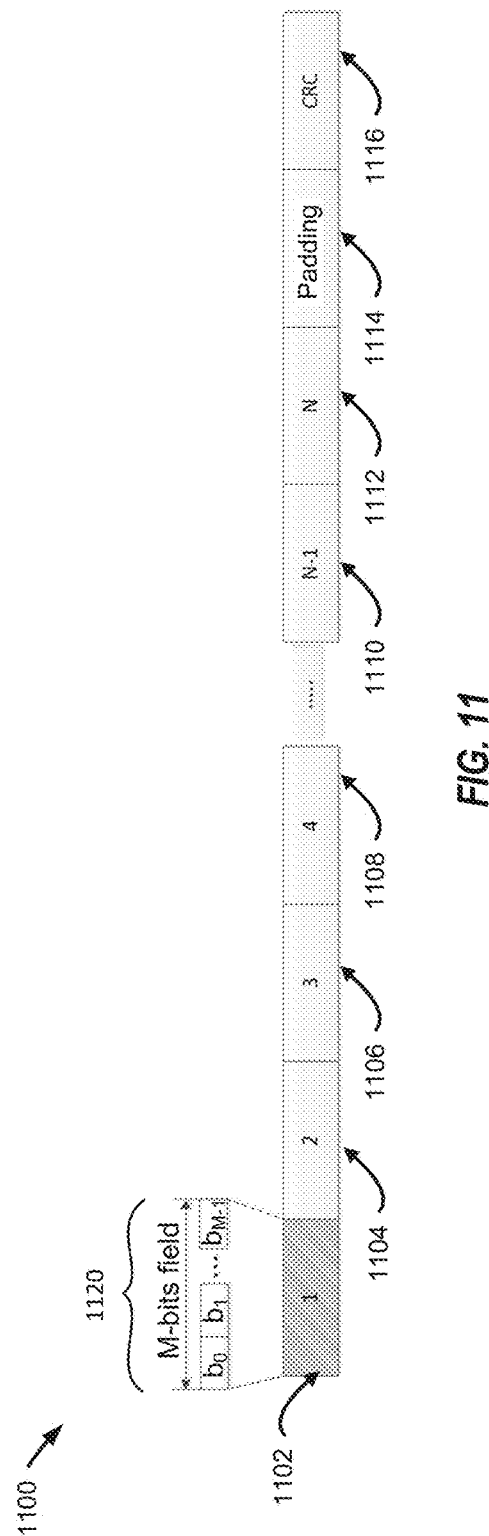
FIG. 11 is an aspect of using explicit signaling to indicate a resource allocation associated with transmission of second reference signals.

Referring to FIG. 11, an aspect of using explicit signaling to indicate a resource mapping associated with transmission of second reference signals is shown and designated 1100. In FIG. 11, an aspect of information that may be used to explicitly indicate a particular CSI-RS resource to be used for stage two signaling (e.g., transmitting the second reference signal 626 of FIG. 6) is shown. As shown in FIG. 11, the information may be included in a particular field of a plurality of fields 1102-1116 of a message (e.g., a L1 control message) received at a user equipment (e.g., the UE 630 of FIG. 6) from a base station (e.g., the base station 610 of FIG. 6).

Each of the fields 1102-1112 may be associated with a particular UE. For example, a first field 1102 may be associated with a first UE, a second field 1104 may be associated with a second UE, and an Nth field 1112 may be associated with an Nth UE. As shown in FIG. 11, the first field 1102 may include an M-bits field 120 that includes M-bits (e.g., bits $b_0$-$b_{M-1}$) that identify a particular CSI-RS resource one of the CSI-RS resources 1060, 1070, 1080 of FIG. 10) that the UE should monitor for stage two signaling. In an aspect, the information may be transmitted from the base station to the UE using a physical downlink control channel (PDCCH). The UE may monitor the PDCCH to determine the stage two resource allocation to be used to transmit stage two reference signals to the UE.

Figure 12:
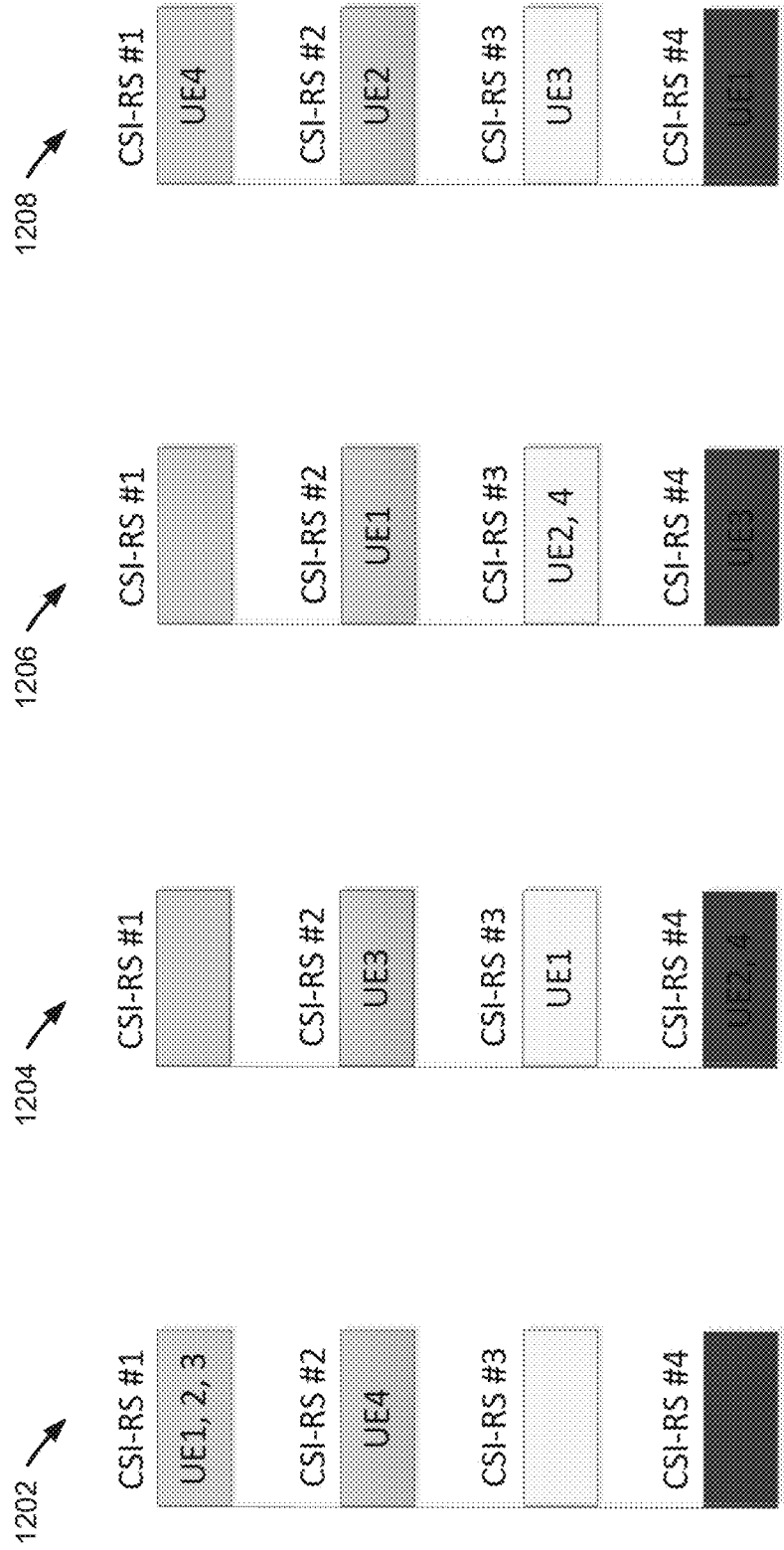
FIG. 12 is an illustrative aspect of transmitting a second reference signal using resource mapping hopping.

Referring to FIG. 12, an illustrative aspect of transmitting a second reference signal using resource mapping hopping is shown and designated 1200. In FIG. 12, a plurality of transmit opportunities 1202, 1204, 1206, 1208 are shown. At the first transmit opportunity 1202, CSI-RS resource #1 (e.g., CSI-RS 160 of FIG. 10) may be used to transmit second stage reference signals (e.g., the second reference signal 626 of FIG. 6) to a set of UE that includes UEs 1, 2, 3. As shown in FIG. 12, CSI-RS resource #2 (e.g., one of the other CSI-RS resources 170 of FIG. 10) may be used to transmit second stage reference signals to a UE 4, and CSI-RS resources #3, #4 may not be used to transmit second stage reference signals. At a second TTI 1204, the CSI-RS resource #1 may not be used to transmit second stage reference signals to the UEs 1-4. During the second TTI 1204, the CSI-RS resources #2, #3, and #4 may be used to transmit second stage reference signals to the UE 1-4. Thus, in contrast to FIG. 10 where each CSI-RS resource was associated with a static set of PMI values, in the aspect of FIG. 12 CSI-RS resources are associated with different sets of PMI based on a hopping pattern.

In an aspect, the hopping pattern may be defined on a group basis and the PMIs of the same group may have the same hopping pattern. In an aspect, a CSI-RS resource index (e.g., information identifying the particular CSI-RS resource to be used for stage two signaling) may be determined according to equation 2:

$$\mathrm{mod}(f(j)+g(j), K) \quad \text{(Equation 2)}$$

where $f(j) \in \{0, \ldots K-1\}$ is the CSI-RS index without hopping and where g(j) is the hopping pattern.

For example, a PMI report of one (1) may be associated with CSI-RS resource #1, #3, #2 and #4 for different transmit opportunities according to the hopping pattern while a PMI report of five (5) may be mapped to CSI-RS resources #1, #4, #3 and #2 for different transmit opportunities according to the hopping pattern. Resource mapping hopping may randomize multi-user spatial multiplexing on each CSI-RS resource that may provide a balanced resource allocation that, over time, averages multi-user interference on each CSI-RS resource. In an aspect, hopping patterns may be used to transmit the stage two reference signals to a group of LIE. For example, the hopping pattern may be transmitted to a group of UE and may indicate that the second reference signals are to be transmitted to the UE group using a first set of allocated resources (e.g., CSI-RS resource 1060) during a first transmit time interval (TTI), and may indicate that the second reference signals are to be transmitted to the LIE group using a second set of resources (e.g., CSI-RS resource 180) during a second TTI.

Figure 13:
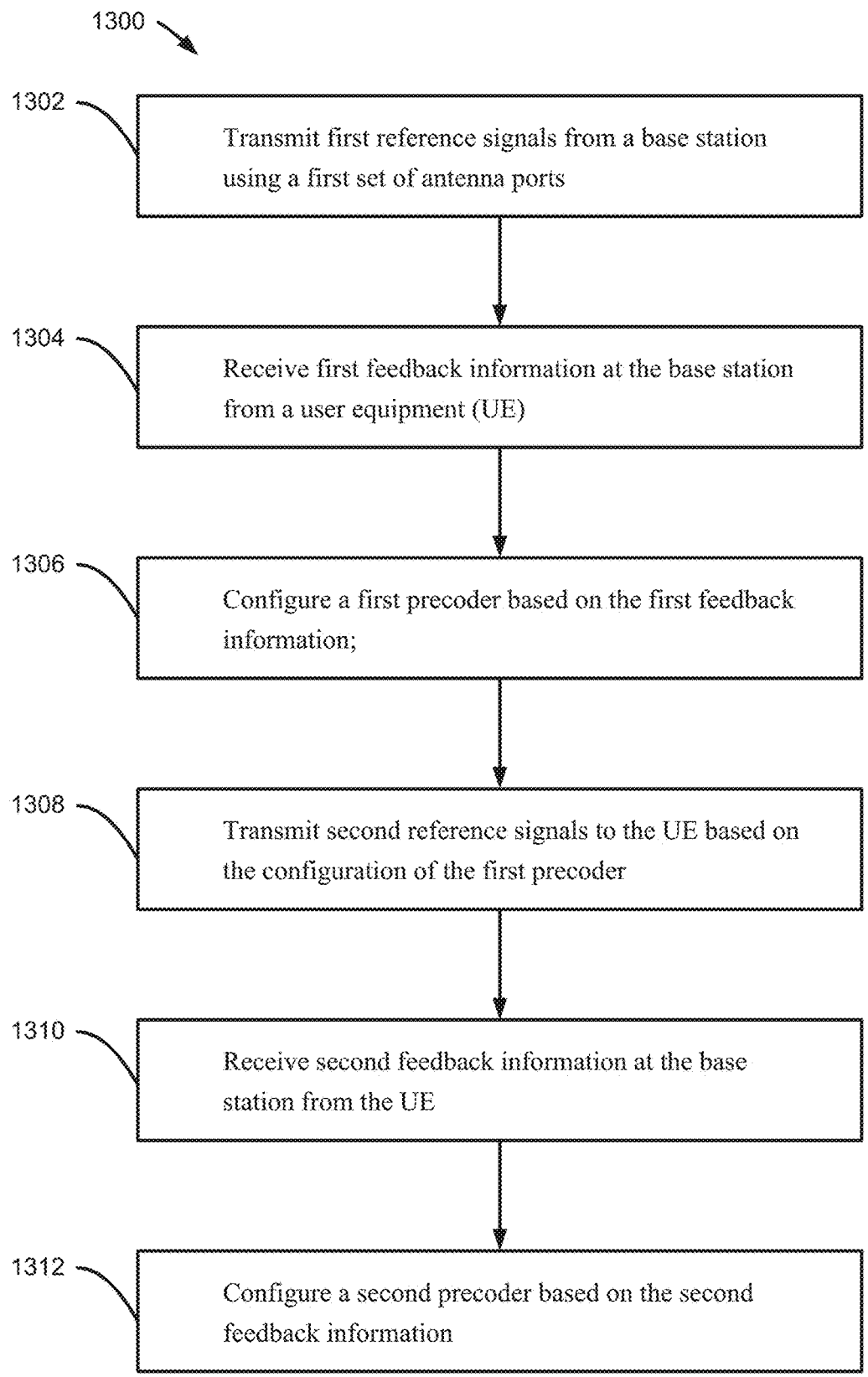
FIG. 13 is an illustrative aspect of a method of configuring a two-stage precoder.

Referring to FIG. 13, an illustrative aspect of a method of configuring a two-stage precoder is shown and designated 1300. At 1302, the method 1300 includes transmitting first reference signals from a base station using a first set of antenna ports. In an aspect, the base station is the base station 610 of FIG. 6 and the first reference signals include the first reference signal 622 of FIG. 6. At 1304, the method 1300 includes receiving first feedback information at the base station from a user equipment (UE). The first feedback information may be associated with the first reference signals. For example, in an aspect, the UE may be the UE 630 of FIG. 6 and the first feedback information may be received at the base station as the first feedback signal 624. At 1306, the method 1300 includes configuring a first precoder based on the first feedback information. In an aspect, the first precoder is the first precoder of the two-stage precoder 616, described with reference to FIG. 6. In another aspect, the first precoder is the port precoder 714, described with reference to FIG. 7.

At 1308, the method 1300 includes transmitting second reference signals to the UE based on the configuration of the first precoder. In an aspect, the second reference signals include the second reference signal 626 of FIG. 1. At 1310, the method 1300 includes receiving second feedback information at the base station from the UE. The second feedback information may be associated with the second reference signals. For example, in an aspect, the second feedback information may be received at the base station as the second feedback signal 624. At 1312, the method 1300 includes configuring a second precoder based on the second feedback information. In an aspect, the second precoder is the second precoder of the two-stage precoder 616, described with reference to FIG. 6. In another aspect, the second precoder is the layer precoder 712, described with reference to FIG. 7.

Figure 14:
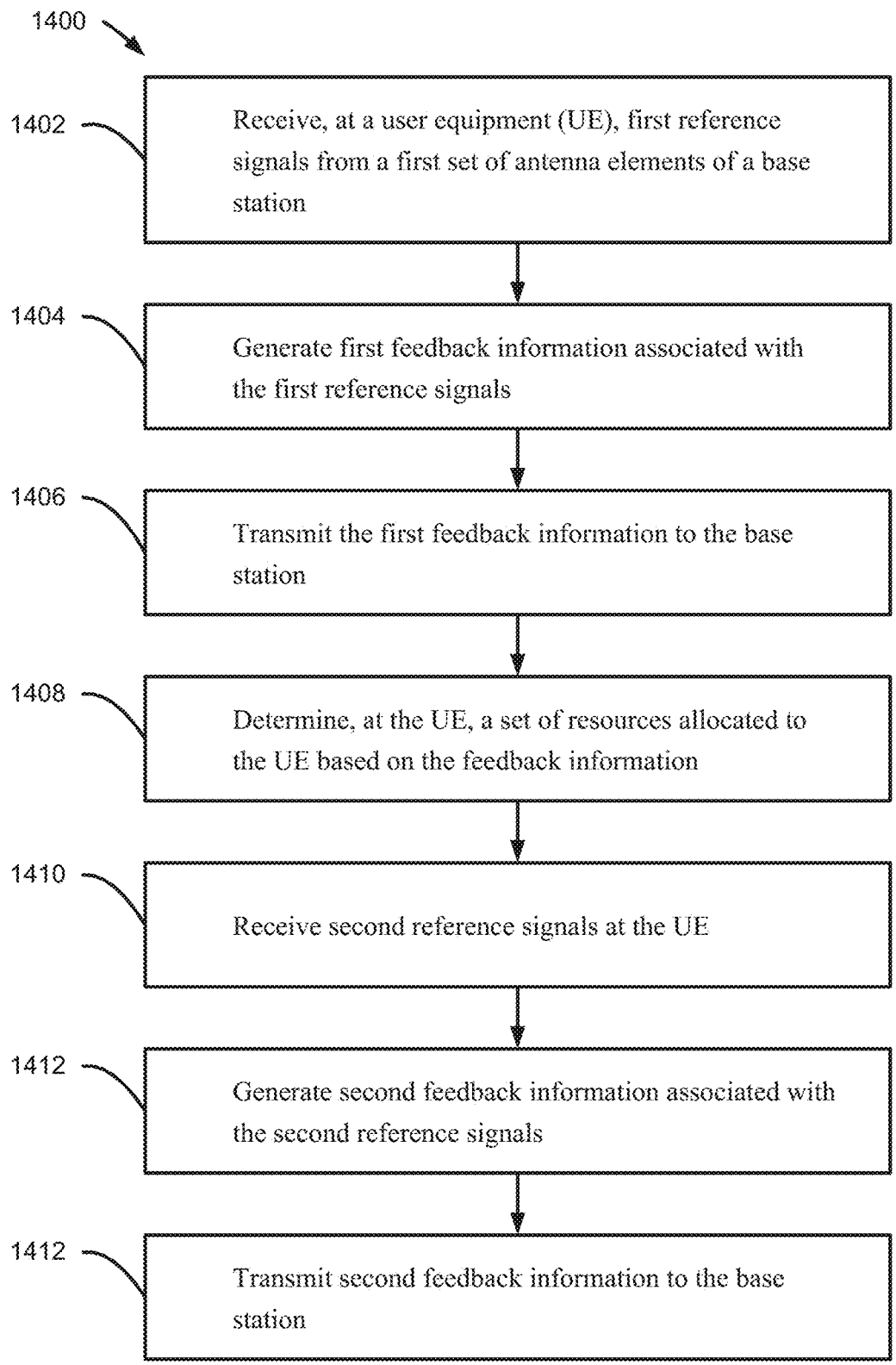
FIG. 14 is an illustrative aspect of a method determining a set of resources allocated to a user equipment (UE) based on feedback information generated by the UE.

Referring to FIG. 14, an illustrative aspect of a method determining a set of resources allocated to a user equipment (UE) based on feedback information generated by the UE is shown and designated 1400. At 1402, the method 1400 includes receiving, at a user equipment (UE), first reference signals from a first set of antenna elements of a base station. In an aspect, the base station is the base station 610 of FIG. 6 and the UE may be the UE 630 of FIG. 6. In an aspect, the first reference signals include the first reference signal 622 of FIG. 6. At 1402, the method 1400 includes generating first feedback information associated with the first reference signals. At 1402, the method 1400 includes transmitting the first feedback information to the base station. In an aspect, the first feedback information may be transmitted to the base station as the first feedback signal 624. At 1402, the method 1400 includes determining, at the UE, a set of resources allocated to the UE based on the first feedback information. In an aspect, the set of resources may be determined based on a hopping pattern and based on the first feedback, as described with reference to FIG. 6. At 1402, the method 1400 includes receiving second reference signals at the UE. The second reference signals are transmitted to the UE from the base station using the allocated set of resources. In an aspect, the second reference signals include the second reference signal 626 of FIG. 6. At 1402, the method 1400 includes generating second feedback information associated with the second reference signals, and, at 1402, the method 1400 includes transmitting the second feedback information to the base station. In an aspect, the second feedback information may be transmitted to the base station as the second feedback signal 628.

Figure 15:
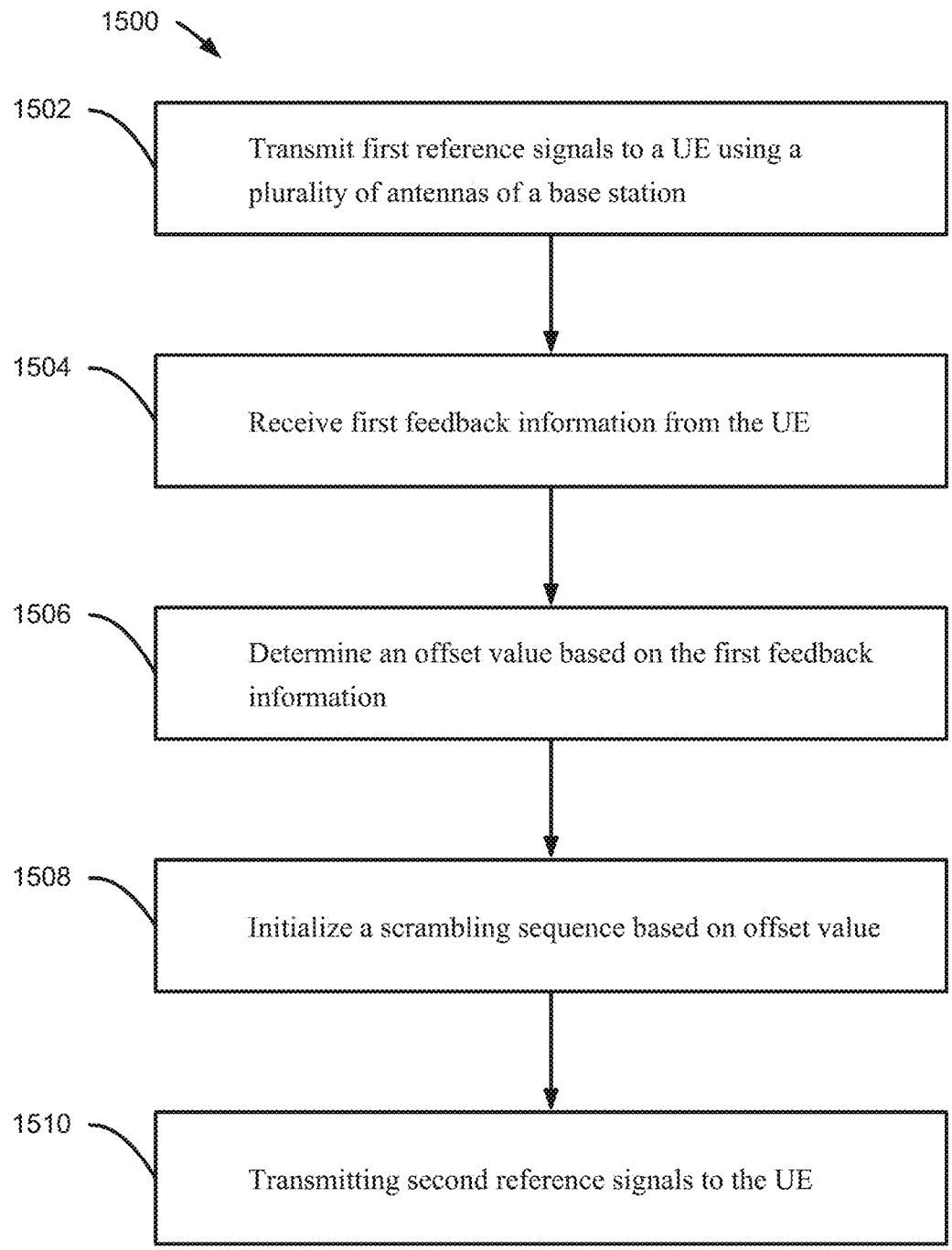
FIG. 15 is an illustrative aspect of a method of initializing a scrambling sequence using an offset value determined based on feedback received from a user equipment.

Referring to FIG. 15, an illustrative aspect of a method of initializing a scrambling sequence using an offset value determined based on feedback received from a user equipment is shown and designated 1500. At 1502, the method 1500 includes transmitting first reference signals to a UE using a plurality of antennas of a base station. Each antenna of the plurality of antennas is associated with one or more antenna elements, and each antenna element is associated with one or more antenna ports. In an aspect, the base station is the base station 610 of FIG. 6 and the first reference signals include the first reference signal 622 of FIG. 6. In an aspect, the UE may be the UE 630 of FIG. 6.

At 1504, the method 1500 includes receiving first feedback information from the UE. The first feedback information is associated with the first reference signals. For example, in an aspect, the first feedback information may be received at the base station as the first feedback signal 624. At 1506, the method 1500 includes determining an offset value based on the first feedback information. In an aspect, the offset value may be determined based on a preceding matrix indicator (PMI) included in the first feedback information, as described with reference to FIG. 6. At 1508, the method 1500 includes initializing a scrambling sequence based on offset value. In an aspect, the scrambling sequence may be initialized using equation 1, as described with reference to FIG. 6. At 1510, the method 1500 includes transmitting second reference signals to the UE. The second reference signals are encoded based on the initialized scrambling sequence. In an aspect, the second reference signals include the second reference signal 626 of FIG. 6, Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the present disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein with reference to FIGS. 1-15. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium in the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

In conjunction with the various aspects of the present disclosure described with reference to FIGS. 1-15, an apparatus is disclosed and includes means for transmitting first reference signals from a base station using a first set of antenna ports. In an aspect of the disclosure, the means for transmitting the first reference signals may be the controller/processor 540 of FIG. 5, the transmit processor 520 of FIG. 5, the transmit MIMO processor 530 of FIG. 5, the modulator/demodulator 532a-532t of FIG. 5, the antennas 534a-534t, the processor 612 of FIG. 6, the two stage precoder 616 of FIG. 6, the transceiver 618 of FIG. 6, the port precoder 714 of FIG. 7, the logical blocks 720, 730, 740, 750 of FIG. 7, or a combination thereof. The apparatus may include means for receiving first feedback information from a user equipment (UE). The first feedback information may be associated with the first reference signals and may include a preceding matrix indicator (PMI) associated with the first reference signals, a rank indication (RI) associated with the first reference signals, or both. For example, the first feedback information may correspond to the first feedback information included in the first feedback signal 624 of FIG. 6. In an aspect, the means for receiving the first feedback information may be the controller/processor 540 of FIG. 5, the receive processor 538 of FIG. 5, the MIMO detector 536 of FIG. 5, the modulator/demodulator 532a-532t of FIG. 5, the antennas 534a-534t, the processor 612 of FIG. 6, the two stage precoder 616 of FIG. 6, the transceiver 618 of FIG. 6, or a combination thereof. The apparatus may include means for configuring a first precoder based on the first feedback information. In an aspect, the means for configuring the first precoder may include the controller/processor 540 of FIG. 5, the transmit processor 520, the transmit MEMO processor 530 of FIG. 5, the processor 612 of FIG. 6, the two stage precoder 616 of FIG. 6, the port precoder 714 of FIG. 7, the logical block 718 of FIG. 7, or a combination thereof.

The apparatus may include means for transmitting second reference signals to the UE based on the configuration of the first precoder. In an aspect, the means for transmitting second reference signals may be the controller/processor 540 of FIG. 5, the transmit processor 520 of FIG. 5, the transmit MIMO processor 530 of FIG. 5, the modulator/ demodulator 532a-532t of FIG. 5, the antennas 534a-534t, the processor 612 of FIG. 6, the two stage precoder 616 of FIG. 6, the transceiver 618 of FIG. 6, the layer precoder 714 of FIG. 7, the logical blocks 720, 730, 740, 750 of FIG. 7, or a combination thereof. The apparatus may include means for receiving second feedback information from the UE. The second feedback information may be associated with the second reference signals and may include a second PMI associated with the second reference signals, a second RI associated with the second reference signals, or both. For example, the second feedback information may correspond to the second feedback information included in the second feedback signal 628 of FIG. 6. In an aspect, the means for receiving second feedback information may be the controller/processor 540 of FIG. 5, the receive processor 538 of FIG. 5, the MIMO detector 536 of FIG. 5, the modulator/demodulator 532a-532t of FIG. 5, the antennas 534a-534t, the processor 612 of FIG. 6, the two stage precoder 616 of FIG. 6, the transceiver 618 of FIG. 6, or a combination thereof. The apparatus may include means for configuring a second precoder based on the second feedback information. In an aspect, the means for configuring the second precoder may include the controller/processor 540 of FIG. 5, the transmit processor 520, the transmit MIMO processor 530 of FIG. 5, the processor 612 of FIG. 6, the two stage precoder 616 of FIG. 6, the layer precoder 712 of FIG. 7, the logical block 716 of FIG. 7, or a combination thereof.

The apparatus may include means for processing a data stream using the first precoder and the second precoder to produce an encoded data stream. The second precoder may map the data stream to a set of antenna ports of a plurality of antenna ports, and the first precoder may map the set of antenna ports to a set of antenna elements of a plurality of antenna elements. In an aspect, the means for processing the data stream may be the controller/processor 540 of FIG. 5, the transmit processor 520 of FIG. 5, the transmit MIMO processor 530 of FIG. 5, the modulator/demodulator 532a-532t of FIG. 5, the antennas 534a-534t, the processor 612 of FIG. 6, the two stage precoder 616 of FIG. 6, the two-stage precoder 710 of FIG. 7, the layer precoder 712, the port precoder 714, the logical blocks 716, 718, 730, 740, 750 of FIG. 7, or a combination thereof. The apparatus may include means for transmitting the encoded data stream to the UE. In an aspect, the means for transmitting the encoded data stream may be the controller/processor 540 of FIG. 5, the transmit processor 520 of FIG. 5, the transmit MIMO processor 530 of FIG. 5, the modulator/demodulator 532a-532t of FIG. 5, the antennas 534a-534t, the processor 612 of FIG. 6, the two stage precoder 616 of FIG. 6, the transceiver 618 of FIG. 6, the two-stage precoder 710 of FIG. 7, the logical blocks 720, 730, 740, 750 of FIG. 7, or a combination thereof.

The apparatus may include means for classifying the UE based on the first feedback information. In an aspect, the means for classifying the UE may include means for associated with the UE with a particular UE group based on the classification. In an aspect, the means for classifying the UE, and the means for associated with the UE with a particular UE group may be the controller/processor 540 of FIG. 5 or the processor 612 of FIG. 6. The apparatus may include means for allocating resources to the UE, and/or a UE group based on the classification of the UE, and means for transmitting control information from the base station to the UE. The control information may identify the resources allocated to the UE based on the classification. In an aspect, the resources allocated to the UE may correspond to a first set of resources of a plurality of resources of the base station. In an aspect, the means for allocating resources to the UE may be the controller/processor 540 of FIG. 5, the transmit processor 520 of FIG. 5, the transmit MIMO processor 530 of FIG. 5, the processor 612 of FIG. 6, or a combination thereof. In an aspect, the means for transmitting the control information may be the controller/processor 540 of FIG. 5, the transmit processor 520 of FIG. 5, the transmit MIMO processor 530 of FIG. 5, the modulator/demodulator 532a-532t of FIG. 5, the antennas 534a-534t, the processor 612 of FIG. 6, the two stage precoder 616 of FIG. 6, the transceiver 618 of FIG. 6, the port precoder 714 of FIG. 7, the logical blocks 720, 730, 740, 750 of FIG. 7, or a combination thereof. The apparatus may include means for periodically transmitting the second reference signals from another set of resources of the plurality of resources. In an aspect, the other set of resources may be determined based on a hopping pattern, and the first set of resources may be different than the other set of resources.

The apparatus may include means for transmitting information that indicates the hopping pattern to the UE. The UE may monitor the additional set of resources for the second reference signals during a particular transmit time interval (TTI) based on the information. In an aspect, the base station and the UE independently determine a next set of set of resources in the hopping pattern based on the first feedback information. The apparatus may include means for means for determining an offset value based on the first feedback information. In an embodiment, the means for determining the offset value may be the controller/processor 540 of FIG. 5, the transmit processor 520 of FIG. 5, the transmit MIMO processor 530 of FIG. 5, the processor 612 of FIG. 6, the two stage precoder 616 of FIG. 6, the two-stage precoder 710 of FIG. 7, or a combination thereof.

The apparatus may include means for initializing a scrambling sequence based at least in part on the offset value. In an aspect, the means for initializing may be the controller/processor 540 of FIG. 5, the transmit processor 520 of FIG. 5, the transmit MIMO processor 530 of FIG. 5, the processor 612 of FIG. 6, the two stage precoder 616 of FIG. 6, the two-stage precoder 710 of FIG. 7, or a combination thereof. In an aspect, the means for initializing may initialize the scrambling sequence using equation 1, described with reference to FIG. 6. The apparatus may include means for encoding the second reference signals based on the initialized scrambling sequence. In an aspect, the means for encoding the second reference signals may be the controller/processor 540 of FIG. 5, the transmit processor 520 of FIG. 5, the transmit MIMO processor 530 of FIG. 5, the modulator/demodulator 532a-532t of FIG. 5, the antennas 534a-534t, the processor 612 of FIG. 6, the two stage precoder 616 of FIG. 6, the transceiver 618 of FIG. 6, the two-stage precoder 710 of FIG. 7, the logical blocks 720, 730, 740, 750 of FIG. 7, or a combination thereof. The apparatus may include means for dynamically modifying the offset value based on another set of resources used to transmit the second reference signals during a second TTI. In an aspect, the means for dynamically modifying the offset value may be the controller/processor 540 of FIG. 5, the transmit processor 520 of FIG. 5, the transmit MIMO processor 530 of FIG. 5, the processor 612 of FIG. 6, the two stage precoder 616 of FIG. 6, the two-stage precoder 710 of FIG. 7, or a combination thereof.

The apparatus may include means for receiving first additional feedback information from additional UE. The first additional feedback information may be associated with the first reference signals. In an aspect, the means for receiving the first additional feedback information may be the controller/processor 540 of FIG. 5, the receive processor 538 of FIG. 5, the MIMO detector 536 of FIG. 5, the modulator/demodulator 532*a*-532*t* of FIG. 5, the antennas 534*a*-534*t,* the processor 612 of FIG. 6, the two stage precoder 616 of FIG. 6, the transceiver 618 of FIG. 6, or a combination thereof. In an aspect, the means for configuring the first precoder may further configure the first precoder based at least in part on the first additional feedback information. The apparatus may include means for receiving second additional feedback information at the base station from the additional UE. The second additional feedback information is associated with the second reference signals. In an aspect, the means for receiving the second additional feedback information may be the controller/processor 540 of FIG. 5, the receive processor 538 of FIG. 5, the MIMO detector 536 of FIG. 5, the modulator/demodulator 532*a*-532*t* of FIG. 5, the antennas 534*a*-534*t,* the processor 612 of FIG. 6, the two stage precoder 616 of FIG. 6, the transceiver 618 of FIG. 6, or a combination thereof. In an aspect, the means for configuring the second precoder may further configure the second precoder at least in part on the second additional feedback information. The apparatus may include means for processing additional data streams using the first precoder and the second precoder to produce additional encoded data streams and means for transmitting the additional encoded data streams to the additional UE. In an aspect, the means for processing additional data streams may be the controller/processor 540 of FIG. 5, the transmit processor 520 of FIG. 5, the transmit MIMO processor 530 of FIG. 5, the modulator/demodulator 532*a*-532*t* of FIG. 5, the antennas 534*a*-534*t,* the processor 612 of FIG. 6, the two stage precoder 616 of FIG. 6, the two-stage precoder 710 of FIG. 7, the layer precoder 712, the port precoder 714, the logical blocks 716, 718, 730, 740, 750 of FIG. 7, or a combination thereof, and the means for transmitting the additional encoded data streams may be the controller/processor 540 of FIG. 5, the transmit processor 520 of FIG. 5, the transmit MIMO processor 530 of FIG. 5, the modulator/demodulator 532*a*-532*t* of FIG. 5, the antennas 534*a*-534*t,* the processor 612 of FIG. 6, the two stage precoder 616 of FIG. 6, the transceiver 618 of FIG. 6, the two-stage precoder 710 of FIG. 7, the logical blocks 720, 730, 740, 750 of FIG. 7, or a combination thereof.

In another aspect of the present disclosure, an apparatus may include means for receiving first reference signals from a first set of antenna elements of a base station. In an aspect, the means for receiving first reference signals may be the controller/processor 580 of FIG. 5, the receive processor 558 of FIG. 5, the MIMO detector 556 of FIG. 5, the demodulator/modulators 554*a*-554*r* of FIG. 5, the antennas 552*a*-552*r* of FIG. 5, the processor 632 of FIG. 6, the transceiver 638 of FIG. 6, or a combination thereof. The apparatus may include means for generating first feedback information associated with the first reference signals and means for transmitting the first feedback information to the base station. In an aspect the means fur generating first feedback information may be the controller/processor 580 of FIG. 5, the transmit processor 564 of FIG. 5, the transmit MIMO processor 566 of FIG. 5, the processor 632 of FIG. 6, or a combination thereof, and the means for transmitting the first feedback information may be the controller/processor 580 of FIG. 5, the transmit processor 564 of FIG. 5, the transmit MIMO processor 566 of FIG. 5, the demodulator/modulators 554*a*-554*r* of FIG. 5, the antennas 552*a*-552*r* of FIG. 5, the processor 632 of FIG. 6, the transceiver 638 of FIG. 6, or a combination thereof.

The apparatus may include means for determining a set of resources allocated to a UE based on the first feedback information. In an aspect, the means for determining the set of resources allocated to the UE may determine the set of resources based on the first feedback information according to a hopping pattern. In an aspect, the means for determining the set of resources allocated to the UE may be the controller/processor 580 of FIG. 5, the transmit processor 564 of FIG. 5, the transmit MIMO processor 566 of FIG. 5, the processor 632 of FIG. 6, or a combination thereof. The apparatus may include means for receiving second reference signals. The second reference signals may be transmitted to the HE from the base station using the allocated set of resources. In an aspect, the means for receiving second reference signals may be the controller/processor 580 of FIG. 5, the receive processor 558 of FIG. 5, the MIMO detector 556 of FIG. 5, the demodulator/modulators 554*a*-554*r* of FIG. 5, the antennas 552*a*-552*r* of FIG. 5, the processor 632 of FIG. 6, the transceiver 638 of FIG. 6, or a combination thereof. The apparatus may include means for generating second feedback information associated with the second reference signals and means for providing second feedback information to the base station. In an aspect, the means for generating second feedback information may be the controller/processor 580 of FIG. 5, the transmit processor 564 of FIG. 5, the transmit MIMO processor 566 of FIG. 5, the processor 632 of FIG. 6, or a combination thereof, and the means for providing second feedback information may be the controller/processor 580 of FIG. 5, the transmit processor 564 of FIG. 5, the transmit MIMO processor 566 of FIG. 5, the demodulator/modulators 554*a*-554*r* of FIG. 5, the antennas 552*a*-552*r* of FIG. 5, the processor 632 of FIG. 6, the transceiver 638 of FIG. 6, or a combination thereof.

The apparatus may include means for receiving control information from the base station. The control information may identify the allocated set of resources, and the base station may allocate the set of resources to the UE based on the first feedback information. In an aspect, the means for determining the set of resources allocated to the UE based on the first feedback information may determine the set of resources based on the control information. The control information may include a plurality of fields, each field of the plurality of fields corresponding to a particular UE and including information that identifies a resource index. The apparatus may include means for monitoring a particular resource index corresponding to a particular field of the plurality of fields. The particular field corresponds to the UE and the particular resource index may identify the set of resources allocated to the UE. In an aspect, the means for monitoring the particular resource index may be the controller/processor 580 of FIG. 5, the receive processor 558 of FIG. 5, the MIMO detector 556 of FIG. 5, the processor 632 of FIG. 6, or a combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:

transmitting first reference signals from a base station using a first set of antenna ports;

receiving first feedback information at the base station from a user equipment (UE), wherein the first feedback information is associated with the first reference signals;

configuring a first precoder based on the first feedback information;

allocating resources to the UE, wherein the allocated resources are associated with the first feedback information;

transmitting second reference signals to the UE based on the configuration of the first precoder, wherein the second reference signals are transmitted to the UE using the allocated resources;

receiving second feedback information at the base station from the UE, wherein the second feedback information is associated with the second reference signals;

configuring a second precoder directly using the second feedback information, wherein the second precoder maps a data stream to a set of antenna ports of a plurality of antenna ports and the first precoder maps the set of antenna ports to a set of antenna elements of a plurality of antenna elements.

2. The method of wireless communication of claim 1, wherein the first feedback information includes a precoding matrix indicator (PMI) associated with the first reference signals, a rank indication (RI) associated with the first reference signals, or both.

3. The method of wireless communication of claim 1, wherein the method includes:
processing a data stream using the first precoder and the second precoder to produce an encoded data stream; and
transmitting the encoded data stream to the UE.

4. The method of wireless communication of claim 1, wherein the method includes:
classifying the UE based on the first feedback information;
allocating resources to the UE based on the classification of the UE; and
transmitting control information from the base station to the UE, wherein the control information identifies the resources allocated to the UE based on the classification.

5. The method of wireless communication of claim 4, wherein the resources allocated to the UE correspond to a first set of resources of a plurality of resources of the base station, and wherein the method includes periodically transmitting the second reference signals from another set of resources of the plurality of resources of the base station, wherein the other set of resources is determined based on a hopping pattern, and wherein the first set of resources is different than the other set of resources.

6. The method of wireless communication of claim 5, wherein the method includes transmitting information that indicates the hopping pattern to the UE, wherein the UE monitors the other set of resources for the second reference signals during a particular transmit time interval (TTI).

7. The method of wireless communication of claim 5, wherein the base station and the UE independently determine a next set of resources in the hopping pattern based on the first feedback information.

8. The method of wireless communication of claim 5, wherein the method includes:
determining an offset value based on the first feedback information;
initializing a scrambling sequence based at least in part on the offset value; and
encoding the second reference signals transmitted using the first set of resources based on the initialized scrambling sequence.

9. The method of wireless communication of claim 8, wherein the method includes dynamically modifying the offset value based on the other set of resources used to transmit the second reference signals during a second TTI.

10. The method of wireless communication of claim 1, wherein the base station includes a plurality of antennas, wherein each antenna of the plurality of antennas is associated with one or more antenna ports.

11. The method of wireless communication of claim 10, wherein the first reference signals are transmitted from each of the antenna ports during a single transmit time interval (TTI), and wherein the first reference signals are transmitted using frequency division multiplexing (FDM).

12. The method of wireless communication of claim 10, wherein the first reference signals are transmitted using the first set of antenna ports of the plurality of antenna ports during a first transmit time interval (TTI).

13. The method of wireless communication of claim 12, wherein the first reference signals are transmitted using a second set of antenna ports of the plurality of antenna ports during a second TTI using TTI bundling, wherein the second set of antenna ports is different from the first set of antenna ports, wherein the second TTI is subsequent to the first TTI, and wherein the first feedback information is associated with the transmission of the first reference signals using the first set of antenna ports and the transmission of the first reference signals using the second set of antenna ports.

14. The method of wireless communication of claim 12, wherein the first reference signals are transmitted from a second set of antenna ports of the plurality of antenna ports during a second TTI, and wherein the second set of antenna ports is different than the first set of antenna ports.

15. A method of wireless communication, comprising:
receiving, at a user equipment (UE), first reference signals from a first set of antenna elements of a base station;
generating first feedback information associated with the first reference signals;
transmitting the first feedback information to the base station;
determining, at the UE, a set of resources allocated to the UE based on the first feedback information, wherein the set of resources allocated to the UE by the base station are associated with the first feedback information;
receiving second reference signals at the UE using the allocated set of resources, wherein the second reference signals are transmitted to the UE from the base station based on a configuration of a first precoder;
generating second feedback information associated with the second reference signals;
transmitting the second feedback information to the base station; and
receiving, at the UE, data streams in response to the configuration of the first precoder.

16. The method of wireless communication of claim 15, wherein the UE determines the set of resources based on the first feedback information according to a hopping pattern.

17. The method of wireless communication of claim 16, wherein the first feedback information indicates a precoding matrix indicator (PMI), a rank indication, or both, wherein the hopping pattern identifies a particular set of resources corresponding to the PMI during a particular transmit time interval (TTI), and wherein the UE determines the set of resources based at least in part on the PMI included in the first feedback information and the hopping pattern.

18. The method of wireless communication of claim 17, wherein the particular TTI is associated with transmission of the second reference signals from the base station to the UE.

19. The method of wireless communication of claim 15, wherein the first set of antenna elements are arranged in a cross-polarized configuration and further comprising receiving control information at the UE from the base station, wherein the control information identifies the allocated set of resources, and wherein the base station allocates the set of resources to the UE based on the first feedback information.

20. The method of wireless communication of claim 10, wherein the first reference signals are transmitted using the first set of antenna ports of the plurality of antenna ports during a first transmit time interval (TTI).

21. The method of claim 1, further comprising:
receiving additional feedback information associated with the first reference signals from at least one additional UE, wherein configuring the first precoder is further based on the additional feedback information.

22. The method of claim 15, wherein the first feedback information comprises a precoding matrix indicator (PMI) index associated with the set of resources, and wherein determining, at the UE, the set of resources allocated to the UE based on the first feedback information comprises identifying, by the UE, the set of resources based on the PMI index.

* * * * *